(12) United States Patent
Ishizuka et al.

(10) Patent No.: US 11,985,047 B2
(45) Date of Patent: May 14, 2024

(54) MANAGEMENT APPARATUS

(71) Applicant: NTT DOCOMO, INC., Chiyoda-ku (JP)

(72) Inventors: Hiroki Ishizuka, Chiyoda-ku (JP); Masashi Anzawa, Chiyoda-ku (JP)

(73) Assignee: NTT DOCOMO, INC., Chiyoda-ku (JP)

(*) Notice: Subject to any disclaimer, the term of this patent is extended or adjusted under 35 U.S.C. 154(b) by 0 days.

(21) Appl. No.: 18/005,225

(22) PCT Filed: Jul. 2, 2021

(86) PCT No.: PCT/JP2021/025217
§ 371 (c)(1),
(2) Date: Jan. 12, 2023

(87) PCT Pub. No.: WO2022/038909
PCT Pub. Date: Feb. 24, 2022

(65) Prior Publication Data
US 2023/0308365 A1 Sep. 28, 2023

(30) Foreign Application Priority Data

Aug. 19, 2020 (JP) .................................. 2020-138663

(51) Int. Cl.
*H04L 41/5009* (2022.01)
*H04L 43/04* (2022.01)
(52) U.S. Cl.
CPC .......... *H04L 41/5009* (2013.01); *H04L 43/04* (2013.01)
(58) Field of Classification Search
CPC . H04L 41/5009; H04L 41/5022; H04L 43/02; H04L 43/04; H04L 43/0882; H04L 43/0888; H04L 43/0894; H04L 43/16
See application file for complete search history.

(56) References Cited

U.S. PATENT DOCUMENTS 7,843,843 B1 * 11/2010 Papp, III ............. H04L 47/2475
370/395.42
8,811,985 B2 * 8/2014 Tanabe .................... H04W 8/26
455/433

(Continued)

FOREIGN PATENT DOCUMENTS

JP 2014-33446 A 2/2014

OTHER PUBLICATIONS

International Search Report dated Sep. 28, 2021 in PCT/JP2021/025217 filed on Jul. 2, 2021, 4 pages (with English Translation).

*Primary Examiner* — Kostas J Katsikis
(74) *Attorney, Agent, or Firm* — Oblon, McClelland, Maier & Neustadt, L.L.P.

(57) ABSTRACT

A management apparatus includes: an acquirer configured to acquire a start request and terminal information, the start request being a request for starting control of quality of a communication service, the communication service being provided for a terminal device connected to one or more networks among a plurality of networks managed by one or more carriers; a determiner configured to determine the one or more networks connected to the terminal device from among the plurality of networks based on the terminal information acquired by the acquirer; and a service manager configured to execute control processing to cause a target network to start QoS control, the target network being a target for the QoS control among the one or more networks connected to the terminal device.

14 Claims, 7 Drawing Sheets

(56) References Cited

U.S. PATENT DOCUMENTS

2012/0058742 A1\* 3/2012 Razoumov .......... H04L 41/5058
                                                455/406
2021/0385088 A1\* 12/2021 Yu ........................ H04L 9/3226

\* cited by examiner

FIG. 2

| CARRIER ID | CARRIER SPECIFIC INFORMATION (CAINF) ||
| --- | --- | --- |
| | API INFORMATION | ACCESS DESTINATION INFORMATION |
| CARRIER A | API INFORMATION A | ADRESS A |
| CARRIER B | API INFORMATION B | ADRESS B |
| ⋮ | ⋮ | ⋮ |

TBL

FIG. 3

| API INFORMATION | • REQUEST FOR START OF QoS CONTROL<br>• REQUEST FOR TERMINATION OF QoS CONTROL<br>• CONFIRMATION OF STATE OF QoS CONTROL<br>• CONFIRMATION OF AVAILABILITY OF QoS CONTROL<br>• ACQUISITION OF SIM INFORMATION<br>• REQUESTED MODE TYPE<br>• REQUESTED COMMUNICATION QUALITY<br>  (THROUGHPUT, DELAY TIME, JITTER, FRAME RATE, AND PACKET LOSS RATE, ETC.)<br>• SIM INFORMATION<br>• USER DEVICE INFORMATION<br>• AREA INFORMATION<br>  (POSITION INFORMATION, MAP INFORMATION, BASE STATION INFORMATION, WEATHER INFORMATION, INFORMATION ON SURROUNDING SHIELDING OBJECT, INFORMATION INDICATIVE OF WHETHER NOTIFICATION OF COMMUNICATION FAILURE, ETC. IS PRESENT)<br>• UNIQUE FUNCTION OF CARRIER |
| --- | --- |

FIG. 4

| TERMINAL INFORMATION (TEINF) | API INFORMATION | ·IMSI<br>·MSISDN<br>·ICCID<br>·CONTRACT INFORMATION<br>·STATE OF CONTRACT |
|---|---|---|
| | USER DEVICE INFORMATION | ·IP ADDRESS OF TERMINAL DEVICE<br>·MODEL NAME OF TERMINAL DEVICE<br>·APPLICATION INFORMATION<br>  (NAME OF APPLICATION PROGRAM, ETC.)<br>·CORRESPONDING SERVER INFORMATION<br>·CORRESPONDING USER DEVICE INFORMATION<br>·SIGNATURE INFORMATION<br>·PACKAGE INFORMATION<br>·OS INFORMATION<br>·MEMORY INFORMATION<br>·CPU INFORMATION<br>·UTILIZATION RATE OF CPU<br>·UTILIZATION RATE OF MEMORY<br>·USER'S IDENTITY INFORMATION<br>  (FINGERPRINT, IRIS, FACE, PASSWORDS, ETC.) |

FIG. 5

| NETWORK INFORMATION | • 5-TUPLE INFORMATION (SOURCE IP ADDRESS, DESTINATION IP ADDRESS, SOURCE PORT NUMBER, DESTINATION PORT NUMBER, PROTOCOL ID)<br>• APN<br>• COMMUNICATION METHOD INFORMATION (3G, 4G, 5G, WIRELESS LAN, TETHERING, WIRED COMMUNICATION, ETC.)<br>• COMMUNICATION QUALITY (THROUGHPUT, DELAY TIME, JITTER, FRAME RATE, PACKET LOSS RATE, ETC.)<br>• OPERATION RATE<br>• AVAILABILITY<br>• NUMBER OF DEVICES CONCURRENTLY CONNECTED |
|---|---|

MANAGEMENT APPARATUS

TECHNICAL FIELD

The present invention relates to a management apparatus.

BACKGROUND ART

Control of quality of service (QoS) is known as a technique for ensuring quality of communication in a communication network, in other words, a network, etc. For example, regarding a system in which terminal devices, such as smartphones, etc., are connected to a network, a method is proposed in which QoS control is executed in accordance with the level of QoS requested by a terminal device (for example, Patent Document 1). In addition, recently, terminal devices are widely used that are capable of being concurrently connected to a plurality of networks managed individually by a plurality of carriers.

RELATED ART DOCUMENT

Patent Document

Patent Document 1: Japanese Patent Application Laid-Open Publication No. 2014-33446

SUMMARY OF THE INVENTION

Problem to be Solved by the Invention

In a situation in which a terminal device is concurrently connected to a plurality of networks, it is desirable to select a network, which is appropriate as a request destination for a start of QoS control, from among the plurality of networks connected to the terminal device. However, for example, when an application provider, which provides application programs to be installed in terminal devices, develops an application program that is capable of selecting a request destination for a start of QoS control from among a plurality of networks connected to a terminal device, a problem arises due to the application program being complicated.

Means for Solving Problem

To solve the above problem, a management apparatus according to a preferred mode of the present invention includes: an acquirer configured to acquire a start request and terminal information, the start request being a request for starting control of quality of a communication service, the communication service being provided for a terminal device connected to one or more networks among a plurality of networks managed by one or more carriers, the terminal information being information related to the terminal device; a determiner configured to determine the one or more networks connected to the terminal device from among the plurality of networks based on the terminal information acquired by the acquirer; and a service manager configured to execute control processing to cause a target network to start the control of the quality of the communication service, the target network being a target for the control of the quality of the communication service among the one or more networks determined by the determiner.

Effects of Invention

According to the present invention, regarding an application program that is installed in a terminal device capable of being concurrently connected to a plurality of networks and that requests start of QoS control, it is possible to prevent the application program from becoming complicated.

BRIEF DESCRIPTION OF THE DRAWINGS

FIG. 2 is an explanatory diagram showing an example of a management table shown in FIG. 1.

FIG. 3 is an explanatory diagram showing an example of API information.

FIG. 4 is an explanatory diagram showing an example of terminal information.

FIG. 5 is an explanatory diagram showing an example of network information.

MODES FOR CARRYING OUT THE INVENTION

1. Embodiments

Figure 1:
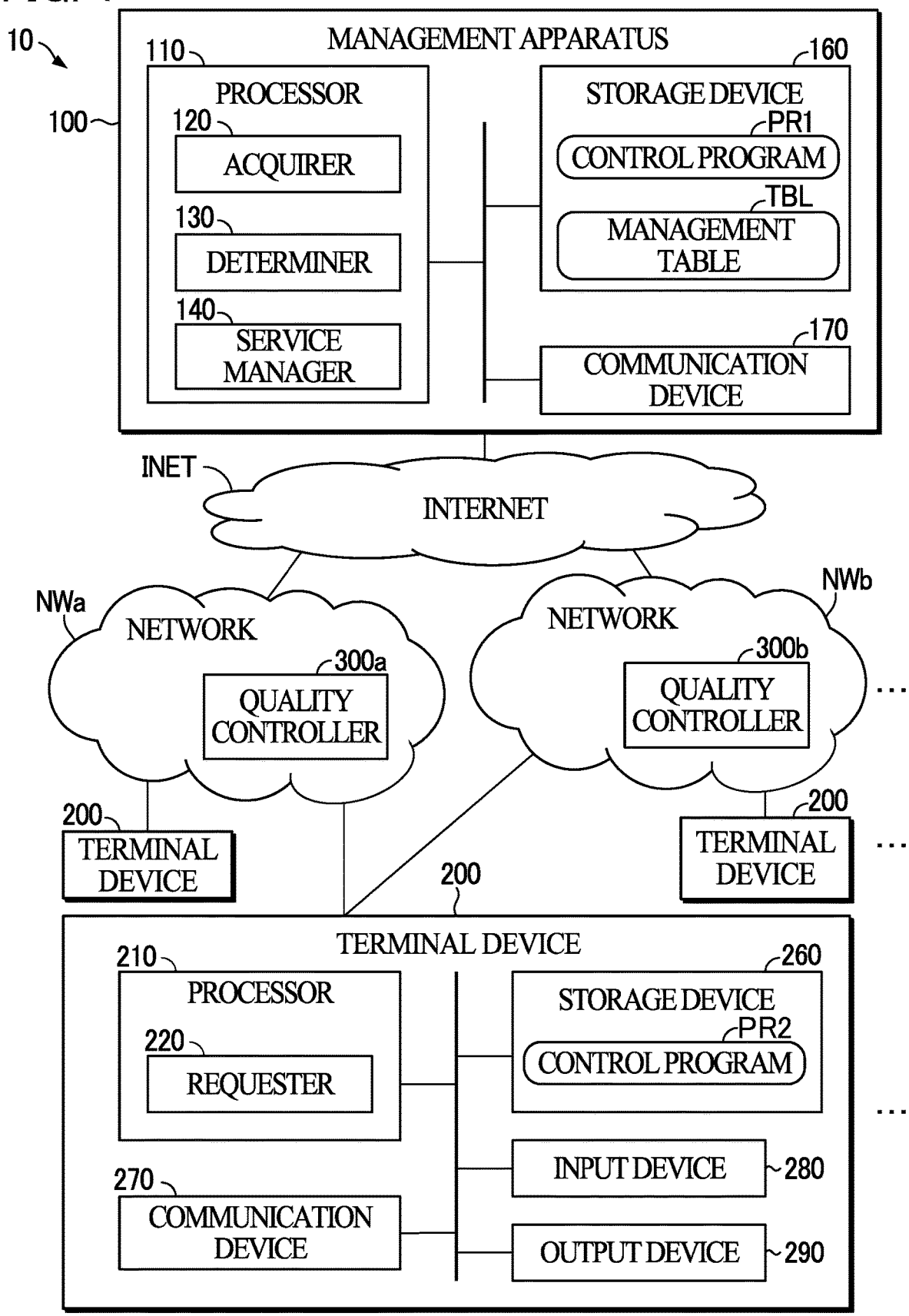
FIG. 1 is a block diagram showing an overall configuration of a network system including a management apparatus according to an embodiment.

FIG. 1 is a block diagram showing an overall configuration of a network system 10 including a management apparatus 100 according to an embodiment. As shown in FIG. 1, the network system 10 includes a plurality of networks NW connected to each other via the Internet INET, the management apparatus 100 connected to the plurality of networks NW via the Internet INET, and a plurality of terminal devices 200 connected to a network NW. A terminal device 200 is connected to one or more networks NW among the plurality of networks NW. For example, the terminal device 200 may be concurrently connected to two or more networks NW among the plurality of networks NW. The management apparatus 100 may be connected to the plurality of networks NW without using the Internet INET. The term "apparatus" in this specification may be understood as another term such as a circuit, a device, a unit, etc.

Each of the plurality of networks NW, which is, for example, a telecommunications line, such as a mobile communication network managed by each of a plurality of carriers that provides communication service, includes one or both of a wired network and a wireless network. The plurality of networks NW may include two or more networks NW managed by the same carrier. The management of a network NW includes, for example, an operation of the network NW. However, when the carrier is a virtual mobile communication carrier, the management of the network NW may not include, for example, an operation of a radio station such as a base station included in the network NW, and may not include an operation of a wired network. Each of the plurality of networks NW includes a quality controller 300. In FIG. 1, to simplify the diagram, nodes (for example, base stations, etc.) other than the quality controller 300 among a plurality of nodes (devices) included in each network NW are omitted.

A connection between the networks NW, a connection between the network NW and the terminal device 200, and a connection between the network NW and the management apparatus 100 may be each, for example, a connection using one of a wired network and a wireless network, or a connection using both of a wired network and a wireless network, as long as the connection allows a plurality of elements to communicate with each other.

In FIG. 1, a reference sign of the network NW is followed by a lower case letter (a or b) to distinguish the plurality of networks NW from each other. In addition, a reference sign of the quality controller 300 included in the network NW is followed by the same lower case letter (a or b) as that of the corresponding network NW.

For example, a network NWa is managed by a carrier that differs from a carrier that manages a network NWb. For example, a quality controller 300a, which is included in the network NWa, controls quality of communication service for the network NWa. For example, a quality controller 300b, which is included in the network NWb, controls quality of communication service for the network NWb.

In this embodiment, it is assumed that control of quality of communication service for a network NW connected to a plurality of terminal devices 200 is capable of being executed for each of the plurality of terminal device 200. The communication service includes, for example, a plurality of quality modes corresponding to a plurality of qualities. For example, a quality mode may be a large capacity mode, in which a large amount of data can be transferred compared to an amount of data transferred in other modes, a low latency mode, in which latency of data is small compared to latency in communication in other modes, and a best effort mode, in which control is based on best-effort, etc. The control of the quality of the communication service includes, for example, bandwidth control, low latency control, and priority control, etc.

In the bandwidth control, for example, the bandwidth of communication in the network NW is controlled. The bandwidth control may be a bandwidth guarantee in which a lower limit of a bandwidth is set, or the bandwidth control may be a bandwidth limit in which an upper limit of a bandwidth is set. Similarly, the low latency control may be, for example, a delay guarantee in which an upper limit of latency is set, or the low latency control may be a delay limit in which a lower limit of the latency is set. In the priority control, for example, a packet related to a specific communication (a unit of data transferred for communication) are transferred as a priority. For example, packets flowing on the network NW are each assigned a priority level, and packets with a higher priority level are processed before other packets.

In the following, the control of the quality of the communication service is referred to as quality of service (QoS) control. For example, in the QoS control in the large capacity mode, the bandwidth control may be executed that is the bandwidth guarantee in which the lower limit of the bandwidth is set. For example, in the QoS control in the low latency mode, the low latency control may executed that is the delay guarantee in which the upper limit of latency is set. The quality mode may be specified, for example, by the terminal device 200 or by a server such as the management apparatus 100. Alternatively, the quality mode may be specified by a device included in the network NW (not shown; different from the quality controller 300). The quality mode may be specified, for example, by specifying a QoS Class Identifier (QCI).

In this embodiment, the QoS control is started, for example, by the terminal device 200 requesting the quality controller 300 via the management apparatus 100 to start the QoS control. In the following, an operation of the network system 10 for the QoS control, in a situation in which the terminal device 200 is concurrently connected to two or more networks NW, will be described.

The management apparatus 100, which is, for example, an information processing apparatus such as a server, is communicable with the plurality of terminal devices 200 connected to respective networks NW. In this embodiment, the management apparatus 100 is communicable with the quality controller 300 included in each of the networks NW. In other words, the network system 10 includes the management apparatus 100 that is not dependent on a carrier. The management apparatus 100 may be managed by a particular carrier among the plurality of carriers. In other words, a particular carrier may operate the management apparatus 100. In this case, for example, the management apparatus 100 may be connected to a network NW managed by the particular carrier without using the Internet INET, whereas the management apparatus 100 may be connected to a network NW managed by another carrier using the Internet INET. Even when the management apparatus 100 is operated by a particular carrier, the operation of the terminal device 200, etc., to operate the management apparatus 100 is not dependent on the carrier.

The management apparatus 100 is, for example, realized by a computer system including a processor 110, a storage device 160, and a communication device 170. Multiple elements of the management apparatus 100 are interconnected by a single bus or by multiple buses for communicating information. Each of the multiple elements of the management apparatus 100 may be constituted by a single device or by multiple devices. Alternatively, one or some of the elements of the management apparatus 100 may be omitted.

The processor 110, which is a processor configured to control the entire management apparatus 100, includes a single chip or multiple chips, for example. The processor 110 includes a central processing unit (CPU) including, for example, interfaces for peripheral devices, arithmetic units, and registers, etc. One, some, or all of the functions of the processor 110 may be realized by hardware such as a digital signal processor (DSP), an application specific integrated circuit (ASIC), a programmable logic device (PLD), and a field programmable gate array (FPGA), etc. The processor 110 executes various processing in parallel or sequentially.

The processor 110, for example, reads a control program PR1 from the storage device 160, and the processor 110 executes the read control program PR1 to function as an acquirer 120, a determiner 130, and a service manager 140. The control program PR1 may be transmitted from another device via a network NW.

Figure 6:
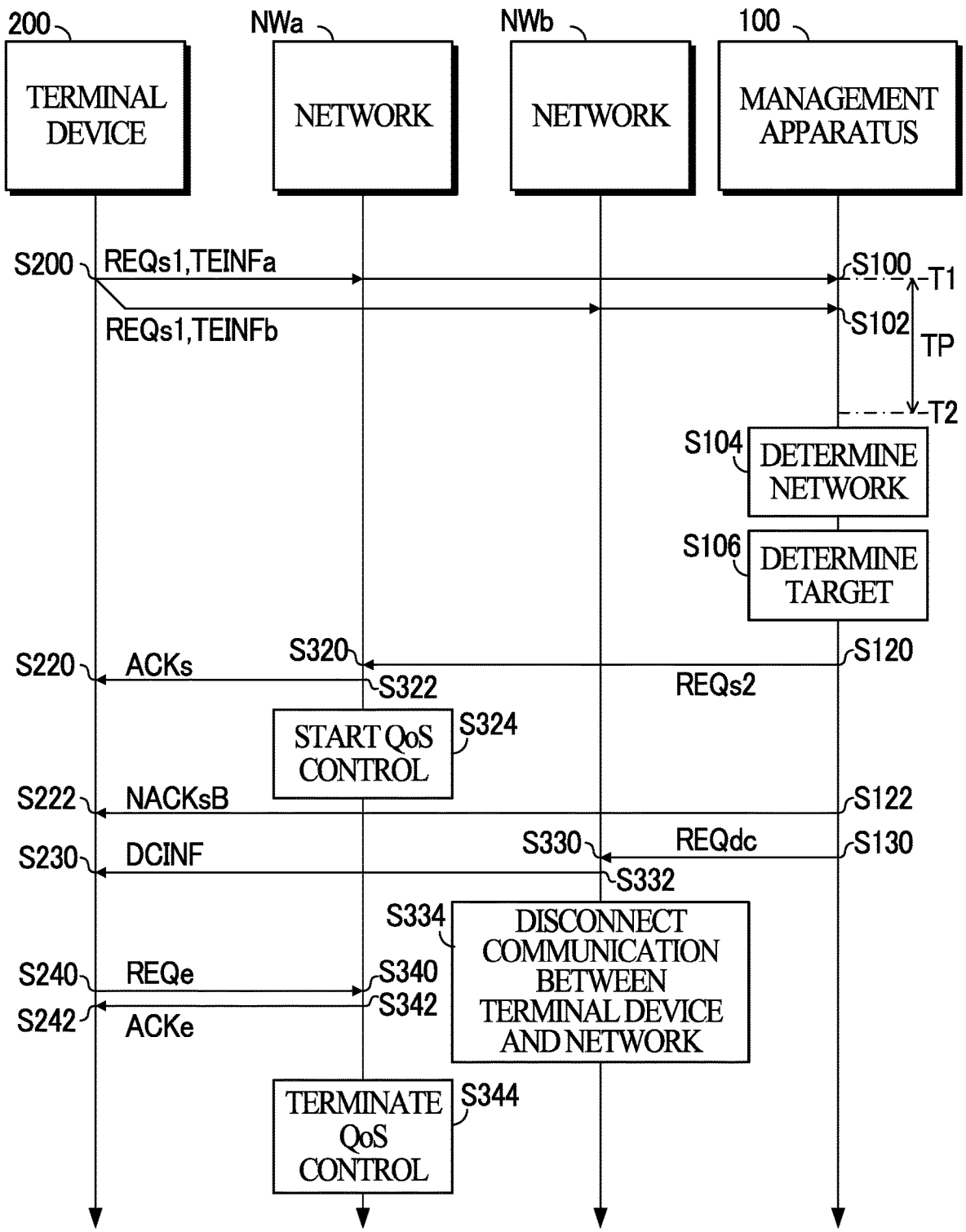
FIG. 6 is a sequence chart showing an example of an operation of the network system shown in FIG. 1.

The acquirer 120 acquires, for example, a start request REQs1 and terminal information TEINF (see S100 in FIG. 6). The start request REQs1 is a request for starting control of quality of communication service. The communication service is provided for the terminal device 200 connected to one or more networks NW among the plurality of networks NW managed by the one or more carriers. The terminal information is information related to the terminal device 200.

In this embodiment, it is assumed that, when the terminal device 200 is connected to networks NW, the terminal device 200 transmits the start request REQs1 and the terminal information TEINF for each of the networks NW connected to the terminal device 200. Accordingly, when the terminal device 200 is connected to the networks NW, the acquirer 120 acquires the start request REQs1 and the terminal information TEINF transmitted from the terminal device 200 for each of the networks NW connected to the terminal device 200. An example of the terminal information TEINF, which is explained with reference to FIG. 4, will be described below.

The determiner 130 determines at least one network NW, which is connected to the terminal device 200 that has requested a start of the QoS control, from among the plurality of networks NW based on the terminal information TEINF acquired by the acquirer 120. For example, the determiner 130 may determine at least one carrier, which manages at least one network NW connected to the terminal device 200 that has transmitted the start request REQs1, from among the plurality of carriers based on the terminal information TEINF acquired by the acquirer 120. Even in this case, the at least one network NW connected to the terminal device 200 is determined.

The service manager 140 executes control processing to cause a target network to start the QoS control. The target network is a target for the QoS control among the at least one network NW determined as the at least one network NW connected to the terminal device 200 by the determiner 130. In the following, when one or some of the plurality of networks NW connected to the terminal device 200 includes the target network NW, a network NW other than the target network NW, among the plurality of networks NW connected to the terminal device 200, is referred to as a non-target network.

The control processing includes, for example, processing, when the at least one network connected to the terminal device 200 includes a plurality of networks, to select one, some, or all of the plurality of networks NW connected to the terminal device 200, as the target network, based on a quality mode indicated by the start request REGs1 among the plurality of quality modes. For example, the service manager 140 determines the target network NW in accordance with the quality mode of the QoS control. Details of a method for determining the target network NW, which are explained with reference to FIG. 6 and FIG. 7, will be described below.

In this embodiment, the control processing includes, for example, processing to cause the quality controller 300 in the target network NW to start the QoS control. Specifically, the control processing includes, for example, processing to transmit a start request REQs2 to the quality controller 300 in the target network NW (see S120 in FIG. 6). In this case, for example, the service manager 140 transmits, as the start request REQs2, the start request REQs1, which has been acquired from the terminal device 200, to the quality controller 300 in the target network NW. Thus, for example, the QoS control for the terminal device 200 (the terminal device 200 that has requested the start of the QoS control) is executed by the quality controller 300 in the target network NW among the at least one network NW connected to the terminal device 200. In the following, the start requests REQs1 and REQs2 may be generally referred to as a start request REQs.

When the plurality of networks NW connected to the terminal device 200 includes the non-target network NW, the service manager 140 may transmit a negative acknowledgement response NACKsB to the terminal device 200 as a response to the start request REQs for the non-target network NW (S122). The negative acknowledgement response NACKs, which is information indicating that the QoS control corresponding to the start request REQs is not executed, indicates that the start request REQs is rejected. Processing to transmit the negative acknowledgement response NACKs to the terminal device 200 may be included in the control processing.

The control processing is executed, for example, based on a management table TBL stored in the storage device 160. An example of the management table TBL, which is explained with reference to FIG. 2, will be described below.

The storage device 160, which is a recording medium readable by the processor 110, is configured to store various data such as a plurality of programs including the control program PR1 to be executed by the processor 110 and the management table TBL. The storage device 160 may include, for example, at least one of a read only memory (ROM), an erasable programmable ROM (EPROM), an electrically erasable programmable ROM (EEPROM), and a random access memory (RAM), etc. The storage device 160 may be referred to as a register, a cache, or a main memory (main storage device), etc.

The communication device 170 is hardware (transmitter and receiver device; transceiver device) for communicating with other devices, such as the terminal device 200 and the quality controller 300, etc., via the network NW. The communication device 170 may be referred as, for example, a network device, a network controller, a network card, or a communication module, etc. The communication device 170 may be include a high-frequency switch, a duplexer, a filter, and a frequency synthesizer, etc., to realize one or both of a frequency division duplex (FDD) and a time division duplex (TDD), for example.

The terminal device 200, which may be, for example, a freely selected information processing apparatus, may be a stationary information apparatus such as a personal computer, etc., or a mobile information terminal apparatus such as a smartphone, a notebook computer, a wearable terminal apparatus, and a tablet terminal apparatus, etc. In the following description, it is assumed that the terminal device 200 is a smartphone.

The terminal device 200 is, for example, realized by a computer system including a processor 210, a storage device 260, a communication device 270, an input device 280, and an output device 290. The processor 210, which is a processor configured to control the entire terminal device 200, includes a configuration that is similar to a configuration of the processor 110 of the management apparatus 100 described above. For example, the processor 210 reads a control program PR2 from the storage device 260, and the processor 210 executes the read control program PR2 to function as a requester 220, etc. The control program PR2 may be transmitted from another device via a network NW.

For example, to request the start of the QoS control, the requester 220 transmits the start request REQs1 and the terminal information TEINF to the management apparatus 100. The request for the start of the QoS control may be an application programming interface (API) call for the start of the QoS control. For example, the requester 220 may request the management apparatus 100 to start the QoS control by executing, for the management apparatus 100, the API call for the start of the QoS control.

In this embodiment, for example, when the terminal device 200 is connected to the plurality of networks NW, the terminal device 200 transmits the start request REQs1 and the terminal information TEINF for each of the plurality of networks NW connected to the terminal device 200.

In this embodiment, for example, to request a termination of the QoS control, the requester 220 transmits a termination request REQe for the termination of the QoS control to the quality controller 300 (see S240 in FIG. 6). The request for the termination of the QoS control may be an API call for the termination of the QoS control. For example, the requester 220 may request the quality controller 300 to terminate the QoS control by executing, for the quality controller 300, the API call for the termination of the QoS control. The requester 220 may transmit the termination request REQe to the quality controller 300 via the management apparatus 100. In this embodiment, transmitting the start request REQs includes the API call for the start of the QoS control, whereas transmitting the termination request REQe includes the API call for the termination of the QoS control.

The storage device 260, which is a recording medium readable by the processor 210, is configured to store various data such as a plurality of programs including the control program PR2 to be executed by the processor 210. The storage device 260, as in the storage device 160 described above, may include, for example, at least one of a ROM, an EPROM, an EEPROM, and a RAM, etc.

The communication device 270, which is hardware (transceiver device) for communicating with other devices, such as the management apparatus 100 and the quality controller 300, etc., via the network NW, includes a configuration that is similar to a configuration of the communication device 170 described above.

The input device 280 is an input device (for example, a keyboard, a mouse, a microphone, a switch, a button, and a sensor, etc.) configured to accept input from the outside. For example, the input device 280 accepts operations for inputting a symbol such as a numeral, a letter, etc., to the processor 210, and operations for selecting an icon displayed on a screen of the terminal device 200. For example, a touch panel configured to detect contact with the screen of the terminal device 200 is suitable as the input device 280. The input device 280 may include a plurality of operation elements capable of being operated by a user.

The output device 290 is an output device, such as a display, etc., configured to execute output to the outside. The output device 290 displays images, for example, under the control of the processor 210. For example, various display panels, such as liquid crystal display panels and organic electro luminescent (EL) display panels, etc., are suitably used as the output device 290. The input device 280 and the output device 290 may be in an integrated configuration (for example, a touch panel). The output device 290 may be an output device including a loudspeaker and a light emitting diode (LED) lamp, etc.

The quality controller 300, which is, for example, an information processing apparatus such as a server, etc., executes the QoS control. The quality controller 300 is communicable with the management apparatus 100 and the terminal device 200. For example, upon receipt of the start request REQs2 for the start of the QoS control for the terminal device 200, the quality controller 300 executes the QoS control on communication executed by the terminal device 200 in the quality mode specified by the start request REQs2.

For example, to execute the QoS control in the quality mode specified by the start request REQs2, the quality controller 300 transmits an acknowledgment response ACKs to the start request REQs2 to the terminal device 200 (see S322 in FIG. 6). When the QoS control is not capable of being executed in the quality mode specified by the start request REQs2, the quality controller 300 transmits a negative acknowledgement response NACKs to the start request REQs2 to the terminal device 200. The quality controller 300 may transmit response information, such as the acknowledgment response ACKs and the negative acknowledgement response NACKs, etc., to the terminal device 200 via the management apparatus 100.

Whether the QoS control is capable of being executed in the quality mode specified by the start request REQs2 may be determined, for example, based on QoS utilization-determination information. The QoS utilization-determination information includes, for example, one, some, or all of a piece of network information on the network NW, a piece of API information on the QoS control, a piece of carrier information on a carrier providing the communication service, and a piece of emergency information. An example of the network information, which is explained with reference to FIG. 5, will be described below. An example of the API information, which is explained with reference to FIG. 3, will be described below. The carrier information is, for example, information for determining whether communication service provided for the terminal device 200 is a communication service provided by a virtual mobile communication carrier. The emergency information is, for example, information indicative of degree of communication emergency (for example, whether a disaster has occurred). The QoS utilization-determination information may include items other than the items described above.

Although FIG. 1 does not show a configuration of the quality controller 300 specifically, the quality controller 300 is, for example, realized by a computer system including a processor configured to control the entire quality controller 300, a storage device configured to store various data, and a communication device for communicating with other devices, as in the management apparatus 100. The quality controller 300 may be realized by a single device or by a set of a plurality of devices separate from each other (in other words, a system). For example, in the quality controller 300, a function of receiving the start request REQs2, etc., and a function of executing the QoS control may be executed by a single device or by a set of two separate devices. Alternatively, the quality controller 300 may include a plurality of devices that executes the QoS control.

Configurations of the management apparatus 100, the terminal device 200, and the quality controller 300, are each not limited to an example shown in FIG. 1. For example, the management apparatus 100 may include an input device and an output device, as well as the terminal device 200. In addition, for example, the management apparatus 100 may include an auxiliary storage device. The auxiliary storage device, which is a recording medium readable by the management apparatus 100, may include, for example, at least one of an optical disc, such as a compact disc ROM (CD-ROM), etc., a hard disk drive, a flexible disc, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip, etc. Similarly, one or both of the terminal device 200 and the quality controller 300 may include an auxiliary storage device. The auxiliary storage device may be referred to as a storage.

As long as the quality controller 300 is capable of executing the QoS control on a corresponding network NW, whether the network NW is defined without the quality controller 300 is not particularly limited.

FIG. 2 is an explanatory diagram showing an example of the management table TBL shown in FIG. 1. The management table TBL stores, for example, carrier specific information CAINF, which includes information required for the service manager 140 to execute the control processing, for each carrier.

For example, the management table TBL includes a plurality of records in one-to-one correspondence with a plurality of carriers. Each of the records in the management table TBL stores, for example, a carrier ID for identifying each carrier among the plurality of carriers, and the carrier specific information CAINF for the carrier indicated by the carrier ID.

The carrier specific information CAINF includes, for example, API information on an API provided for the management apparatus 100 from the carrier, and access destination information indicative of an access destination for requesting the start of the QoS control, etc. The API information and the access destination information may be disclosed by the carrier. An example of the API information, which is explained with reference to FIG. 3, will be described below. The access destination information may be, for example, an internet protocol (IP) address of the quality controller 300 or a uniform resource locator (URL) of the API. The access destination information may be included in the API information.

The management apparatus 100, for example, transmits the start request REQs2 to the quality controller 300 in the target network NW based on the carrier specific information CAINF for a carrier that manages the target network NW. The carrier that manages the target network NW is, for example, a carrier that manages the quality controller 300 to which the start request REQs2 is transmitted.

The management table TBL is not limited to the example shown in FIG. 2. For example, when the plurality of carriers includes a carrier that manages two or more networks NW, two or more carrier IDs that differ from each other may be assigned to the carrier. The two or more carrier IDs assigned to the carrier are, for example, in one-to-one correspondence with the two or more networks NW managed by the carrier. In other words, the management table TBL includes the plurality of records in one-to-one correspondence with the plurality of networks NW managed by one or more carriers. The fact that a carrier manages two or more networks NW may be, for example, that a carrier manages two or more networks NW that have access destinations (pieces of access destination information) for requesting the start of the QoS control that are different from each other.

FIG. 3 is an explanatory diagram showing an example of the API information.

The API information includes information on, for example, a request for the start of the QoS control, a request for the terminate of the QoS control, a confirmation of a state of the QoS control, a confirmation of an availability of the QoS control, and acquisition of subscriber identity module (SIM) information. In addition, the API information includes, for example, one, some, or all of a piece of information indicative of a requested mode type, a piece of information indicative of requested communication quality, a piece of SIM information, a piece of user device information, a piece of area information regarding an area in which the terminal device 200 is located, and a piece of information indicative of an unique function of a carrier.

The requested mode type is, for example, a quality mode of the QoS control requested toward the quality controller 300. The requested communication quality is, for example, communication quality realized by the QoS control requested toward the quality controller 300, or target communication quality. The communication quality includes, for example, throughput, delay time, jitter, frame rate, and packet loss rate, etc. The SIM information is, for example, information stored in a SIM. The user device information is, for example, information stored in the terminal device 200.

An example of the SIM information and an example of user device information, which are explained with reference to FIG. 4, will be described below.

The area information includes one, some, or all of a piece of position information indicative of a position of the terminal device 200, a piece of map information on the area in which the terminal device 200 is located, a piece of base station information regarding a base station in the area in which the terminal device 200 is located, a piece of weather information on the area in which the terminal device 200 is located, a piece of shielding information regarding a shielding object around the terminal device 200, and a piece of information indicative of whether a notification of a communication failure in the area in which the terminal device 200 is located is present. The area information may include items other than the items described above. The unique function of a carrier is, for example, a function that is different from a function common to the carrier and other carriers, and that is independently added by the carrier.

The items included in the API information are not limited to examples shown in FIG. 3. For example, the API information may not include one or some of the items shown in FIG. 3. Alternatively, the API information may include not only one, some, or all of the items shown in FIG. 3, but may also include an item other than those shown in FIG. 3 (for example, the access destination information described in FIG. 2, etc.). In addition, the items included in the API information may be included in the QoS utilization-determination information as described in FIG. 1.

FIG. 4 is an explanatory diagram showing an example of the terminal information TEINF. The terminal information TEINF includes, for example, SIM information and user device information.

The SIM information is referred to by the management apparatus 100, for example, to determine a carrier that provides a communication service for the terminal device 200 that has transmitted the start request REQs. For example, the SIM information includes one, some, or all of an international mobile subscriber identity (IMSI), a mobile subscriber integrated services digital network number (MSNSDN), an integrated circuit card ID (ICCID), a piece of contract information, and a piece of information indicative of a state of the contract. The items included in the SIM information are not limited to examples shown in FIG. 4. For example, the SIM information may include not only one, some, or all of the items shown in FIG. 4, but may also include an item other than those shown in FIG. 4.

The user device information, as in the SIM information, may be referred to by the management apparatus 100 to determine the carrier that provides communication service to the terminal device 200 that has transmitted the start request REQs, for example. The user device information includes, for example, one, some, all of an IP address of the terminal device 200, a model name of the terminal device 200, a piece of application information, a piece of a corresponding server information, a piece of a corresponding user device information, a piece of signature information, a piece of package information, a piece of operating system (OS) information on an OS in the terminal device 200, a piece of memory information on a memory in the terminal device 200, a piece of CPU information on a CPU in the terminal device 200, a utilization rate of the CPU, a utilization rate of the memory, and a piece of user identity information.

The IP address of the terminal device 200, which is, for example, provided for the terminal device 200 to use communication service provided by a carrier, is information for identifying the carrier and the network NW, etc. The application information is, for example, information indicative of the name of an application program that is being executed by the terminal device 200. The user identity information is, for example, information used to authenticate a user (a fingerprint, an iris, a face, passwords, etc.). The items included in the user device information are not limited to examples shown in FIG. 4. For example, the user device information may include not only one, some, or all of the items shown in FIG. 4, but may also include an item other than those shown in FIG. 4.

In addition, the items included in the terminal information TEINF are not limited to examples shown in FIG. 4. For example, the terminal information TEINF may not include the SIM information or the user device information. Alternatively, the terminal information TEINF may include one or both of the SIM information and the user device information, and information other than both the SIM information and the user device information (for example, network information shown in FIG. 5, which will be described later).

FIG. 5 is an explanatory diagram showing an example of the network information. Items included in the network information are, for example, included in the QoS utilization-determination information as described in FIG. 1, and the items are referred to by the quality controller 300 to determine whether the quality controller 300 is capable of executing the QoS control in the quality mode specified by the start request REQs2. The items included in the network information may be included in the terminal information TEINF. In this case, a base station, etc., included in a network NW may add the network information to the terminal information TEINF transmitted from the terminal device 200 to the management apparatus 100 via the network NW.

The network information includes, for example, one, some, or all of a piece of 5-tuple information, an access point name (APN), a piece of communication method information, a piece of information indicative of communication quality, a piece of information indicative of an operation rate of a base station, a piece of information indicative of an availability of the base station, and a piece of information indicative of the number of devices that are concurrently connected to the base station. The 5-tuple information is information including a source IP address, a destination IP address, a source port number, a destination port number, and a protocol ID. The communication method information indicates, for example, a communication method such as a third generation mobile communication system (3G), a fourth generation mobile communication system (4G), a fifth generation mobile communication system (5G), a wireless local area network (LAN), tethering, and wired communication, etc.

The items included in the network information are not limited to examples shown in FIG. 5. For example, the network information may include not only one, some, or all of the items shown in FIG. 5, but may also include an item other than those shown in FIG. 5. In addition, when the network information is included in the terminal information TEINF, the items of the network information included in the QoS utilization-determination information may differ from the items of the network information included in the terminal information TEINF. When the network information is included in the terminal information TEINF, the determiner 130 may determine, for example, the at least one network NW connected to the terminal device 200 among the plurality of networks NW based on the network information (for example, the APN, etc.) included in the terminal information TEINF.

FIG. 6 is a sequence chart showing an example of an operation of the network system 10 shown in FIG. 1. In the example shown in FIG. 6, it is assumed that the start request REQs1 is transmitted from a terminal device 200, which is concurrently connected to the networks NWa and NWb, among the plurality of terminal devices 200. Accordingly, in the description of FIG. 6, unless otherwise noted, the terminal device 200 means a terminal device 200 that is concurrently connected to the networks NWa and NWb. In the example shown in FIG. 6, it is assumed that the quality mode indicated by the start request REQs1 is the low latency mode among the plurality of quality modes. In the example shown in FIG. 6, it is assumed that the terminal device 200 executes processing to transmit the start request REQs1 and the terminal information TEINF to the management apparatus 100 for each of the networks NW connected to the terminal device 200.

First, the requester 220 of the terminal device 200 not only transmits a start request REQs1 and terminal information TEINFa to the management apparatus 100 via the network NWa, but also transmits a start request REQs1 and terminal information TEINFb to the management apparatus 100 via the network NWb (S200). The destinations (the address of the management apparatus 100) of the start requests REQs1 are the same and do not depend on the carrier of the plurality of carriers.

The contents of the start request REQs1 transmitted from the terminal device 200 to the management apparatus 100 via the network NWa are the same as the contents of the start request REQs1 transmitted from the terminal device 200 to the management apparatus 100 via the network NWb. In addition, the terminal information TEINFa, which is transmitted from the terminal device 200 to the management apparatus 100 via the network NWa, includes, for example, information for identifying a carrier, such as an IP address provided by the carrier that manages the network NWa. Similarly, the terminal information TEINFb, which is transmitted from the terminal device 200 to the management apparatus 100 via the network NWb, includes, for example, information for identifying a carrier, such as an IP address provided by the carrier that manages the network NWb.

In the example shown in FIG. 6, it is assumed that the start request REQs1, etc., which has been transmitted from the terminal device 200 to the management apparatus 100 via the network NWa, reaches the management apparatus 100 before the start request REQs1, etc., which has been transmitted from the terminal device 200 to the management apparatus 100 via the network NWb. The order in which the start requests REQs1, etc., reach the management apparatus 100 is not limited to the example shown in FIG. 6.

The acquirer 120 of the management apparatus 100 acquires the start request REQs1 and the terminal information TEINFa transmitted from the terminal device 200 to the management apparatus 100 via the network NWa (S100). Until a predetermined time TP has elapsed since a first timing T1 at which the acquirer 120 acquired a first start request REQs1, the acquirer 120 waits for the arrival of the start request REQs, etc., transmitted from the terminal device 200 via another network NW (in the example shown in FIG. 6, the network NWb). A period from the first timing T1 to a timing at which the predetermined time TP has elapsed since the first timing T1 (the predetermined time TP from the first timing T1 to a second timing T2) is an example of a "predetermined period of time." In the following, the period from the first timing T1 to the timing at which the predetermined time TP has elapsed since the first timing T1 is simply referred to as the predetermined time TP.

The first timing T1 may be determined as follows. For example, the acquirer 120 acquires a start request REQs1 at an acquired timing, and when the acquirer 120 did not acquire a start request REQs1, of which the contents are the same as the contents of the acquired start request REQs1, within a period from a timing, which is prior to the acquired timing by the predetermined time TP, to the acquired timing, the acquirer 120 may determine the acquired timing to be the first timing.

Alternatively, the acquirer 120 may determine the first timing using a flag corresponding to a set of the terminal device 200, which has transmitted the start request REQs1, and the contents of the start request REQs1. For example, when the flag corresponding to the start request REQs1 acquired from the terminal device 200 is not set, the acquirer 120 determines a timing of acquiring the start request REQs1 as the first timing to set the flag. When the QoS control corresponding to the start request REQs1 is terminated, the acquirer 120 may, for example, reset the flag corresponding to the start request REQs1 corresponding to the QoS control that is terminated.

In the example shown in FIG. 6, the acquirer 120 acquires the start request REQs1 and the terminal information TEINFb transmitted from the terminal device 200 via the network NWb within the period from the first timing T1 to the timing at which the predetermined time TP has elapsed since the first timing T1 (S102).

The determiner 130 of the management apparatus 100 determines the networks NW connected to the terminal device 200 from among the plurality of networks NW based on the terminal information TEINF acquired by the acquirer 120 within the predetermined time TP (S104). For example, the determiner 130 determines the networks NW connected to the terminal device 200 from among the plurality of networks NW based on the IP address included in the terminal information TEINF. The determiner 130 may determine the networks NW connected to the terminal device 200, for example, by determining carriers that manage the networks NW connected to the terminal device 200 based on the terminal information TEINF. Specifically, the determiner 130 may not only determine the carrier, which manages the network NWa, based on the IP address included in the terminal information TEINFa, but may also determine the carrier, which manages the network NWb, based on the IP address included in the terminal information TEINFb. Alternatively, the determiner 130 may not only determine the carrier, which manages the network NWa, based on the SIM information (for example, ICCID, etc.) included in the terminal information TEINFa, but may also determine the carrier, which manages the network NWb, based on the SIM information included in the terminal information TEINFb.

The service manager 140 of the management apparatus 100 determines, for example, the target network NW from among the plurality of networks NWa and NWb, which are connected to the terminal device 200, based on the quality mode indicated by the start request REQs1 (S106). The target network NW is a network NW that is a target for the QoS control, as described in FIG. 1. In other words, the target network NW is a network NW toward which the QoS control is requested (a target to which the start request REQs2 will be transmitted). In the example shown in FIG. 6, the quality mode indicated by the start request REQs1 is the low latency mode; accordingly, the service manager 140 selects a network NWa from among the networks NWa and the NWb as the target network NW.

Thus, when the quality mode indicated by the start request REQs1 is the low latency mode in a situation in which the terminal device 200 is connected to the plurality of networks NW, one of the plurality of networks NW connected to the terminal device 200 is selected as the target network NW. The following method may be used as a method for selecting the target network NW when the quality mode indicated by the start request REQs1 is the low latency mode in a situation in which the terminal device 200 is connected to the plurality of networks NW.

For example, in a first method, the service manager 140 selects a network NW with the highest communication quality (for example, a network NW with the smallest communication delay) among the plurality of networks NW connected to the terminal device 200, as the target network NW. The communication quality of each of the networks NW may be indicated, for example, by the communication quality of the network information included in the QoS utilization-determination information.

In a second method, the service manager 140 may select a network NW, which includes a base station that is closest to the terminal device 200, among the plurality of networks NW connected to the terminal device 200, as the target network NW. In a third method, when the terminal device 200 communicates with an edge server, the service manager 140 may select a network NW, which includes an edge server that is closest to the terminal device 200, among the plurality of networks NW connected to the terminal device 200, as the target network NW. The edge server is, for example, an information processing apparatus such as a server for realizing a multi-access edge computing (MEC). The MEC is a system for placing a computer system, such as a server and storage, at a location closer to a user in a telecommunications line, such as a mobile communications network.

In the second method and the third method described above, it is assumed that the management apparatus 100 includes a database that stores not only location information indicative of locations of base stations and edge servers of each of the networks NW, but also routing methods for setting communication routes within each of the networks NW. For example, when the API information shown in FIG. 3 includes base station information on a base station in the area in which the terminal device 200 is located, the base station information on the base station in the area in which the terminal device 200 is located may be included in the API information based on the database described above.

The method for selecting the target network NW is not limited to the first method, the second method, or the third method described above. For example, the service manager 140 may randomly select the target network NW from among the networks NWa and NWb when both the networks NWa and NWb have a communication delay that is less than a delay guaranteed by the low latency mode indicated by the start request REQs1.

After determining the network NWa, which is a target, the service manager 140 transmits a start request REQs2 to the network NWa, which is a target, based on the carrier specific information CAINF corresponding to the network NWa, which is a target (S120).

In this embodiment, it is assumed that the start request REQs2 is transmitted from the service manager 140 of the management apparatus 100 to the quality controller 300 of the target network NW. The start request REQs2 includes, for example, the items included in the start request REQs1 acquired from the terminal device 200. The start request REQs2 may include not only one, some, or all of the items included in the API information shown in FIG. 3, but may also include the items included in the start request REQs1.

Accordingly, transmitting the start request REQs2 to the quality controller 300 includes transmitting the start request REQs1 to the quality controller 300. In other words, the control processing executed by the service manager 140 may include processing to transmit the start request REQs1, which has acquired from the terminal device 200, to the quality controller 300.

The quality controller 300a of the network NWa that is a target receives the start request REQs2 transmitted from the management apparatus 100 (S320). The quality controller 300a determines, based on the QoS utilization-determination information, whether the QoS control in the quality mode specified by the start request REQs2 (in the example shown in FIG. 6, the low latency mode) is capable of being executed. In the example shown in FIG. 6, it is assumed that the quality controller 300a is capable of executing the QoS control in the quality mode specified by the start request REQs2. Accordingly, the quality controller 300a transmits an acknowledgment response ACKs (information indicating that the QoS control will be executed in accordance with the start request REQs) to the terminal device 200 in response to the start request REQs2 (S322). The quality controller 300a may transmit the acknowledgment response ACKs to the start request REQs2 to the terminal device 200 and the management apparatus 100 or alternatively, the quality controller 300a may transmit the acknowledgment response ACKs to the start request REQs2 to the terminal device 200 via the management apparatus 100.

In addition, the quality controller 300a starts the QoS control in the quality mode specified by the start request REQs2 (S324). For example, the quality controller 300a determines the phone number of the terminal device 200 based on the SIM information included in the API information to start the QoS control for the terminal device 200 corresponding to the specified phone number in the quality mode specified by the start request REQs2. Thus, the QoS control for the terminal device 200 starts.

The service manager 140 of the management apparatus 100 does not transmit the start request REQs2 to the quality controller 300b of the network NWb; accordingly, the service manager 140 transmits a negative acknowledgement response NACKsB to the terminal device 200 as information indicating that the start request REQs1 for the network NWb is rejected (S122).

In addition, the service manager 140 of the management apparatus 100 transmits a disconnection request REQdc for a disconnection of communication between the terminal device 200 and the network NWb, which is a non-target, to the network NWb (for example, a base station of the network NWb) (S130). Thus, the network NWb receives the disconnection request REQdc (S330). Transmitting the disconnection request REQdc may include an API call for the disconnection of the communication. In other words, an API for processing to disconnect the communication may be provided.

To disconnect the communication between the terminal device 200 and the network NWb, the network NWb, which has received the disconnection request REQdc, transmits disconnection information DCINF indicative of the disconnection of the communication to the terminal device 200 (S332). The network NWb may transmit the disconnection information DCINF to the terminal device 200 via the management apparatus 100. The network NWb disconnects the communication between the terminal device 200 and the network NWb in response to the disconnection request REQdc (S334). Accordingly, it is possible to increase vacant resources of the network system 10 (more specifically, vacant resources of the network NWb).

The network NWb may not accept the disconnection request REQdc. In this case, the network NWb may transmit a negative response, which indicates that the communication between the terminal device 200 and the network NWb is not disconnected, to the management apparatus 100. Alternatively, the disconnection of the communication between the non-target network NWb and the terminal device 200 may not be requested. In other words, processing of steps S130, S330, S332, S334, and S230 may not be executed.

The terminal device 200 receives response information, such as the acknowledgment response ACKs, the negative acknowledgement response NACKsB, and the disconnection information DCINF, etc., as a response to the start request REQs1 (S220, S222, and S230). For example, by receiving the acknowledgment response ACKs as a response to the start request REQs1 for the network NWa, the terminal device 200 is capable of recognizing that the QoS control corresponding to the start request REQs1 is started in the network NWa. In addition, for example, by receiving the negative acknowledgement response NACKsB as a response to the start request REQs1 for the network NWb, the terminal device 200 is capable of recognizing that the QoS control is not executed in the network NWb. In addition, for example, by receiving the disconnect information DCINF from the network NWb, the terminal device 200 is capable of recognizing that the communication between the network NWb and the network NWb is disconnected.

To terminate the QoS control for the terminal device 200, the requester 220 of the terminal device 200 transmits a termination request REQe to the quality controller 300a of the network NWa executing the QoS control for the terminal device 200 (S240). The requester 220 may transmit the termination request REQe to the quality controller 300a and the management apparatus 100, or the requester 220 may transmit the termination request REQe to the quality controller 300a via the management apparatus 100. Information for accessing the quality controller 300a (such as the address of the quality controller 300a) may be included in, for example, the acknowledgment response ACKs or alternatively, the information may be transmitted from the management apparatus 100 to the terminal device 200.

The quality controller 300a of the network NWa receives the termination request REQe from the terminal device 200 (S340). The quality controller 300a transmits an acknowledgment response ACKe to the termination request REQe to the terminal device 200 (S342). Accordingly, the terminal device 200 receives the acknowledgment response ACKe to the termination request REQe from the quality controller 300a (S242). The quality controller 300a terminates the QoS control for the terminal device 200 indicated by the termination request REQe (S344).

The quality controller 300a may transmit the acknowledgment response ACKe to the termination request REQe to the terminal device 200 and the management apparatus 100, or alternatively, the quality controller 300a may transmit the acknowledgment response ACKe to the termination request REQe to the terminal device 200 via the management apparatus 100. In this case, the management apparatus 100 can recognize the termination of the QoS control for the terminal device 200.

Thus, in this embodiment, by transmitting the start request REQs1 to the management apparatus 100, the terminal device 200 is capable of causing the quality controller 300, which is included in an appropriate network NW among the networks NW connected to the terminal device 200, to start the QoS control. In other words, the terminal device 200 is capable of causing the quality controller 300 to start the QoS control without specifically recognizing the carrier that provides the communication service. Accordingly, in this embodiment, it is possible to prevent an application program for requesting the execution of the QoS control from becoming complicated, for example.

For example, to use the QoS control, an application provider providing an application program may incorporate a QoS control software development kit (SDK) for using the QoS control into the application program. The destination for the start request REQs1 is the management apparatus 100 regardless of the carrier that manages the networks NW connected to the terminal device 200 to which the application program is installed. As a result, in this embodiment, in development for an application program that is capable of requesting any of a plurality of networks NW, which is managed by a plurality of carriers, to execute the QoS control, it is not necessary to change the destination for the start request REQs1 in accordance with the carrier. Accordingly, in this embodiment, it is possible to prevent the application program from becoming complicated. In other words, in this embodiment, even when an application provider develops the application program, which is capable of requesting any of a plurality of carriers to execute the QoS control, it is possible to prevent the application program from becoming complicated.

In addition, in this embodiment, the management apparatus 100 selects a network NW (target network NW), which is appropriate as a request destination for the start of the QoS control, from among the plurality of networks NW connected to the terminal device 200. Accordingly, for example, when an application program, which is installed in the terminal device 200 capable of being concurrently connected to a plurality of networks NW, requests the start of the QoS control, it is possible to prevent the application program from becoming complicated.

Figure 7:
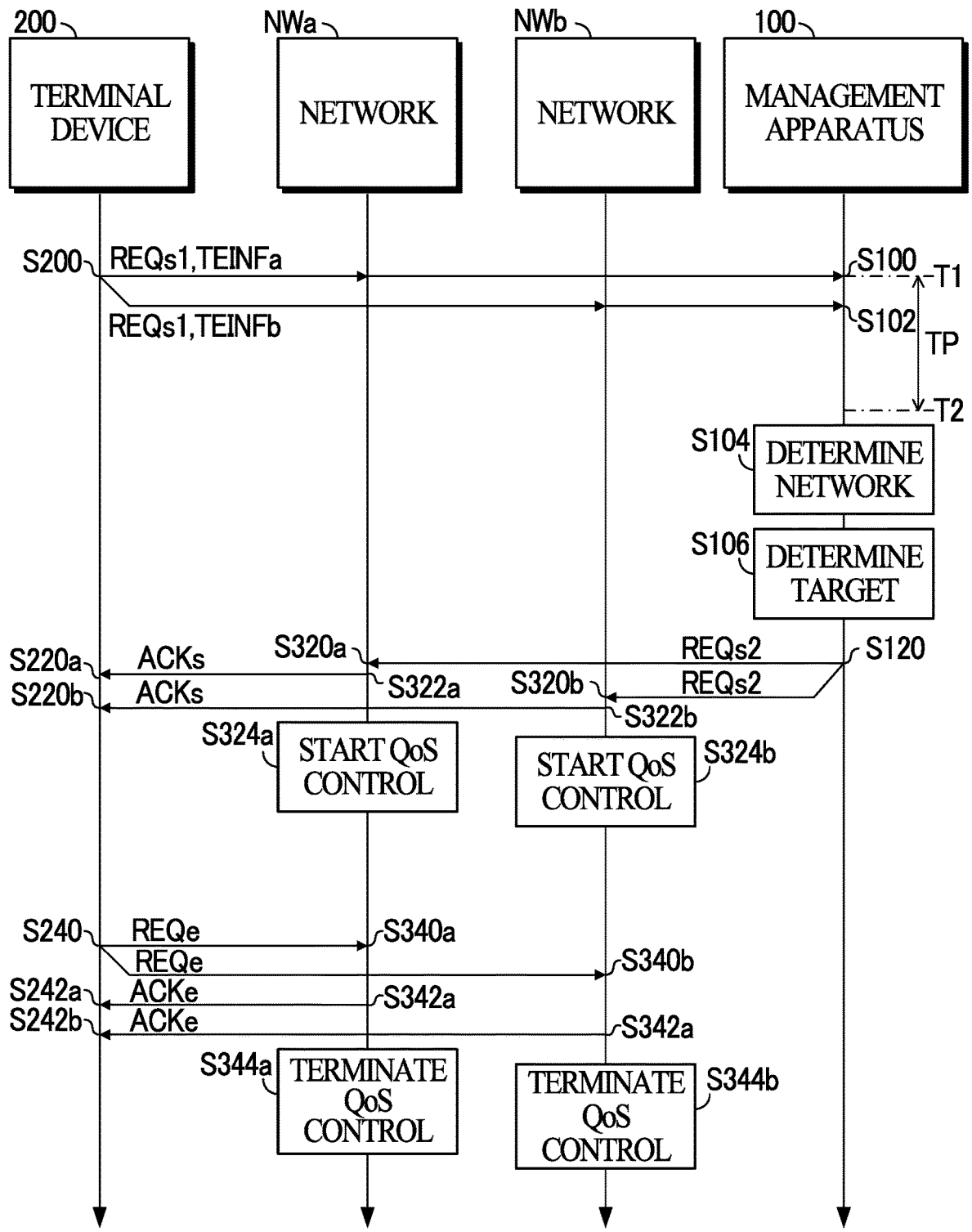
FIG. 7 is a sequence chart showing another example of the operation of the network system shown in FIG. 1.

FIG. 7 is a sequence chart showing another example of the operation of the network system 10 shown in FIG. 1. In the example shown in FIG. 7, similarly to the example shown in FIG. 6, it is assumed that the start request REQs1 is transmitted from a terminal device 200, which is concurrently connected to the networks NWa and the NWb, among the plurality of terminal devices 200. Accordingly, even in the description of FIG. 7, unless otherwise noted, the terminal device 200 means a terminal device 200 that is concurrently connected to the networks NWa and NWb. In the example shown in FIG. 7, it is assumed that the quality mode indicated by the start request REQs1 is the large capacity mode among the plurality of quality modes. In the example shown in FIG. 7, operations from a start to a point in time at which the management apparatus 100 determines the networks NW connected to the terminal device 200 (S200, S100, S102, and 104) is similar to those shown in FIG. 6; accordingly, explanations are omitted. In addition, in FIG. 7, detailed explanations are omitted for operations similar to those described in FIG. 6.

After the determiner 130 determines the networks NW connected to the terminal device 200, the service manager 140 of the management apparatus 100 determines the target network NW based on the quality mode indicated by the start request REQs1, for example (S106). In the example shown in FIG. 7, the quality mode indicated by the start request REQs1 is the large capacity mode; accordingly, the service manager 140 selects all of the networks NWa and NWb connected to the terminal device 200, as target networks NW.

The service manager 140 of the management apparatus 100 transmits a start request REQs2 to each of the quality controller 300a of the network NWa and the quality controller 300b of the network NWb (S120). Accordingly, the quality controller 300a of the network NWa and the quality controller 300b of the network NWb each receive the start request REQs2 transmitted from the management apparatus 100 (S320a and S320b).

Processing of steps S322a and S322b is similar to processing of step S322 described in FIG. 6, and processing of steps S324a and S324b is similar to processing of step S324 described in FIG. 6. For example, the quality controller 300a of the network NWa transmits an acknowledgment response ACKs to the start request REQs2 to the terminal device 200 to start the QoS control in the large capacity mode specified by the start request REQs2 (S322a and S324a). Similarly, the quality controller 300b of the network NWb transmits an acknowledgment response ACKs to the start request REQs2 to the terminal device 200 to start the QoS control in the large capacity mode specified by the start request REQs2 (S322b and S324b). In the example shown in FIG. 7, the QoS control is executed in the network NWb; accordingly, processing to disconnect communication between the terminal device 200 and the network NWb (for example, processing of S130, etc., in FIG. 6) is not executed.

Processing of steps S340a and S340b is similar to processing of step S340 described in FIG. 6. Processing of steps S342a and S342b is similar to processing of step S342 described in FIG. 6, and processing of steps S344a and S344b is similar to processing of step S344 described in FIG. 6.

For example, the quality controller 300a of the network NWa and the quality controller 300b of the network NWb each receive a termination request REQe from the terminal device 200 (S340a and S340b). The quality controller 300a of the network NWa transmits an acknowledgment response ACKe to the termination request REQe to the terminal device 200 to terminate the QoS control indicated by the termination request REQe (S342a and S344a). Similarly, the quality controller 300b of the network NWb transmits an acknowledgment response ACKe to the termination request REQe to the terminal device 200 to terminate the QoS control indicated by the termination request REQe (S342b and S344b).

Processing of steps S220a and S220b is similar to processing of step S220 described in FIG. 6. Processing of step S240 is similar to processing of step S240 described in FIG. 6, and processing of steps S242a and S242b is similar to processing of step S242 described in FIG. 6.

For example, the terminal device 200 receives the acknowledgment response ACKs from each of the networks NWa and NWb as a response to the start request REQs1 (S220a and S220b). In addition, the terminal device 200 transmits the termination request REQe to each of the networks NWa and NWb, and receives the acknowledgment response ACKe from each of the networks NWa and NWb as a response to the termination request REQe (S240, S242a and S242b).

Thus, even when the quality mode specified by the start request REQs2 is the large capacity mode, the management apparatus 100, which does not depend on a carrier, selects a network NW, which is appropriate as a request destination for the start of the QoS control, from among the plurality of networks NW connected to the terminal device 200. Accordingly, even when the quality mode specified by the start request REQs2 is the large capacity mode, it is possible to prevent the application program from becoming complicated as in a case in which the quality mode specified by the start request REQs2 is the low latency mode.

The operations of the network system 10 are not limited to examples shown in FIGS. 6 and 7. For example, the determiner 130 of the management apparatus 100 may determine the networks NW connected to the terminal device 200 based on the terminal information TEINF each time the terminal information TEINF is received within the period from the first timing T1 to the timing at which the predetermined time TP has elapsed since the first timing T1.

In addition, for example, when the target network NW is not capable of executing the QoS control in the quality mode specified by the start request REQs2, the target network NW may transmit a negative acknowledgement response NACKs to the start request REQs2 to the management apparatus 100. In this case, the service manager 140 of the management apparatus 100 may execute processing to determine a target network NW again. In addition, when the target network NW transmits the negative acknowledgement response NACKs to the start request REQs2 to the management apparatus 100, the target network NW may transmit rejection reason information, which indicates a reason why the QoS control is not capable of being executed, to the management apparatus 100. When the QoS control is not executed, the service manager 140 of the management apparatus 100 may transmit the negative acknowledgement response NACKs to the terminal device 200, or alternatively, the service manager 140 may transmit both the negative acknowledgement response NACKs and the rejection reason information to the terminal device 200.

In addition, when the quality mode specified by the start request REQs1 does not apply to any of a plurality of predetermined quality modes regarding the QoS control, the service manager 140 of the management apparatus 100 may reject the start request REQs1. In this case, the service manager 140 of the management apparatus 100 may transmit a negative acknowledgement response NACKs to the terminal device 200 without transmitting the start request REQs2 to the quality controller 300. Even in this case, the service manager 140 of the management apparatus 100 may transmit the rejection reason information together with the negative acknowledgement response NACKs to the terminal device 200.

The service manager 140 of the management apparatus 100 may determine, based on a condition other than the quality mode, whether to reject the start request REQs1. For example, the service manager 140 of the management apparatus 100 may determine, based on the QoS utilization-determination information, whether the networks NW connected to the terminal device 200 are capable of executing the QoS control in the quality mode specified by the start request REQs2. For example, when the terminal device 200 is not connected to a network NW that is capable of executing the QoS control in the quality mode specified by the start request REQs1, the service manager 140 of the management apparatus 100 may transmit the negative acknowledgement response NACKs to the terminal device 200 without transmitting the start request REQs2 to the quality controller 300. Even in this case, the service manager 140 of the management apparatus 100 may transmit the rejection reason information together with the negative acknowledgement response NACKs to the terminal device 200.

In addition, for example, when the quality mode specified by the start request REQs1 is the large capacity mode, the service manager 140 of the management apparatus 100 may select a network NW, which has communication quality that is higher than or equal to a predetermined level, from among the plurality of networks NW connected to the terminal device 200, as the target network NW. In this case, the service manager 140 of the management apparatus 100 may execute processing to disconnect communication between a non-target network NW and the terminal device 200. In other words, the service manager 140 of the management apparatus 100 may execute processing to disconnect communication between the terminal device 200 and a network NW, which has communication quality that is lower than the predetermined level, among the plurality of networks NW connected to the terminal device 200. By disconnecting the communication between the non-target network NW and the terminal device 200, it is possible to increase vacant resources of the network system 10.

In addition, even when the quality mode specified by the start request REQs1 is neither the low latency mode nor the large capacity mode, the target network NW is selected in accordance with, for example, the quality mode specified by the start request REQs1.

In addition, for example, when the start request REQs1 indicates the start of the QoS control for communication between a predetermined server (not shown in FIG. 1, etc.), which is connected to the plurality of terminal devices 200, and each terminal device 200, the management apparatus 100 may determine a target network NW for each terminal device 200. For example, the service manager 140 of the management apparatus 100 may select, as a target network NW corresponding to a terminal device 200 of the plurality of terminal devices 200 connected to the predetermined server, one of the plurality of networks NW connected to the terminal device 200. In addition, the service manager 140 may disconnect communication between the terminal device 200 and a non-target network NW of the plurality of networks NW connected to the terminal device 200. Accordingly, it is possible to increase vacant resources of the network system 10.

The following method may be used as a method for selecting a target network NW corresponding to a terminal device 200 of a plurality of terminal devices 200 connected to the predetermined server. For example, the service manager 140 may select a network NW, which has the lowest amount of communication per unit time, from among the plurality of networks NW connected to the terminal device 200, as the target network NW. Alternatively, the service manager 140 may select a network NW, which is managed by a carrier with the smallest area expansion, from among the plurality of networks NW connected to the terminal device 200, as the target network NW. The method for selecting the target network NW corresponding to a terminal device 200 of the plurality of terminal devices 200 connected to the predetermined server is not limited to each of the examples described above. For example, the service manager 140 may randomly select a network NW from among the plurality of networks connected to a terminal device 200, as the target network NW.

In this embodiment, the management apparatus 100 includes the acquirer 120, the determiner 130, and the service manager 140. The acquirer 120 acquires the start request REQs1 and the terminal information TEINF, and the start request REQs1 is a request for starting control (QoS control) of a quality of communication service, and the communication service is provided for the terminal device 200 connected to the one or more networks NW among the plurality of networks managed by the one or more carriers, and the terminal information is information related to the terminal device 200. The determiner 130 determines the one or more networks NW connected to the terminal device 200 from among the plurality of networks NW based on the terminal information TEINF acquired by the acquirer 120. The service manager 140 executes the control processing to cause a target network NW, which is a target for the QoS control among the one or more networks NW determined by the determiner 130, to start the QoS control.

Thus, in this embodiment, the management apparatus 100, which has acquired the start request REQs1 from the terminal device 200, executes the control processing to cause an appropriate network NW among the networks NW connected to the terminal device 200 to start the QoS control. Accordingly, in this embodiment, by transmitting the start request REQs1 to the management apparatus 100 regardless of which carrier is providing the communication service, the terminal device 200 can cause the appropriate network NW among the networks NW connected to the terminal device 200 to start the QoS control. In other words, the destination for the start request REQs1 is the management apparatus 100 regardless of the carriers that manage the networks NW connected to the terminal device 200 to which an application program is installed. As a result, in this embodiment, in development for an application program that is capable of requesting any of a plurality of networks NW, which is managed by one or more carriers, to execute the QoS control, it is possible to prevent the application program from becoming complicated.

In addition, in this embodiment, the management apparatus 100 selects a network NW (target network NW), which is appropriate as a request destination for the start of the QoS control, from among the plurality of networks NW connected to the terminal device 200. Accordingly, for example, when an application program, which is installed in the terminal device 200 capable of being concurrently connected to a plurality of networks NW, requests to start the QoS control, it is possible to avoid the application program from becoming complicated.

In this embodiment, the determiner 130 may determine the one or more networks NW connected to the terminal device 200 based on the terminal information TEINF acquired by the acquirer 120 within the predetermined period of time (period from the first timing T1 to the timing at which the predetermined time TP has elapsed since the first timing T1). In this case, the determiner 130 can easily determine, based on the terminal information TEINF acquired by the acquirer 120 within the predetermined period of time, whether the one or more networks NW connected to the terminal device 200 comprises a plurality of networks NW.

In this embodiment, the control processing may include the processing, when the one or more networks NW connected to the terminal device 200 include the plurality of networks NW, to select one, some, or all of the plurality of networks NW connected to the terminal device 200, as the target network NW, based on the quality mode indicated by the start request REQs1 among the plurality of quality modes. In this case, the service manager 140 can select a network NW, which is appropriate for the quality mode specified by the start request REQs1, from among the plurality of networks NW connected to the terminal device 200, as the target network NW.

For example, when the quality mode indicated by the start request REQs1 is the low latency mode, the service manager 140 may select a network NW of the plurality of networks NW connected to the terminal device 200, as the target network NW. In this case, the non-target network NW does not execute the QoS control for the terminal device 200; accordingly, it is possible to prevent execution of unnecessary QoS control.

In addition, for example, when the quality mode indicated by the start request REQs1 is the low latency mode, the service manager 140 may select a network NW with the highest communication quality among the plurality of networks NW connected to the terminal device 200, as the target network NW. In this case, the target network NW can appropriately provide QoS in the low latency mode for the terminal device 200.

In addition, for example, the service manager 140 may execute the processing to disconnect communication between the terminal device 200 and a network NW (non-target network NW) other than the target network NW among the plurality of networks NW connected to the terminal device 200. In this case, it is possible to increase vacant resources of the network system 10 (more specifically, vacant resources of the non-target network NW).

In addition, for example, when the quality mode indicated by the start request REQs1 is the large capacity mode, the service manager 140 may select all of the plurality of networks NW connected to the terminal device 200 as the target network NW. In this case, the target network NW can appropriately provide QoS in the large capacity mode for the terminal device 200.

In addition, for example, when the quality mode indicated by the start request REQs1 is the large capacity mode, the service manager 140 may select a network NW, which has communication quality higher than or equal to the predetermined level, from among the plurality of networks NW connected to the terminal device 200, as the target network NW. In addition, the service manager 140 may execute the processing to disconnect the communication between the non-target network NW and the terminal device 200. Even in this case, the target network NW can appropriately provide the QoS in the large capacity mode for the terminal device 200. In addition, when the communication between the non-target network NW and the terminal device 200 is disconnected, it is possible to increase vacant resources of the network system 10 (more specifically, vacant resources of the non-target network NW).

2. Modifications

The invention is not limited to the embodiment described above. Specific modifications will be explained below. Two or more modifications freely selected from the following modifications may be combined.

First Modification

In the embodiment described above, examples are indicated in which the terminal device 200 transmits the start request REQs1 and the terminal information TEINF for each of the networks NW connected to the terminal device 200; however, the present invention is not limited to these examples. For example, the terminal device 200 may randomly transmit terminal information TEINF to the management apparatus 100 until a predetermined time has elapsed since the terminal device 200 transmitted the start request REQs1 and the terminal information TEINF to the management apparatus 100. Even in this case, the determiner 130 of the management apparatus 100 determines the networks NW connected to the terminal device 200 based on the terminal information TEINF acquired by the acquirer 120 within the predetermined period of time. The predetermined period of time is, for example, a period from the first timing T1, at which the acquirer 120 acquires the start request REQs1 from the terminal device 200, to the timing at which the predetermined time TP has elapsed since the first timing T1. The predetermined time, which corresponds to a period in which the terminal device 200 randomly transmits the terminal information TEINF to the management apparatus 100, may be the same as, or be different from, the predetermined time TP.

Figure 8:
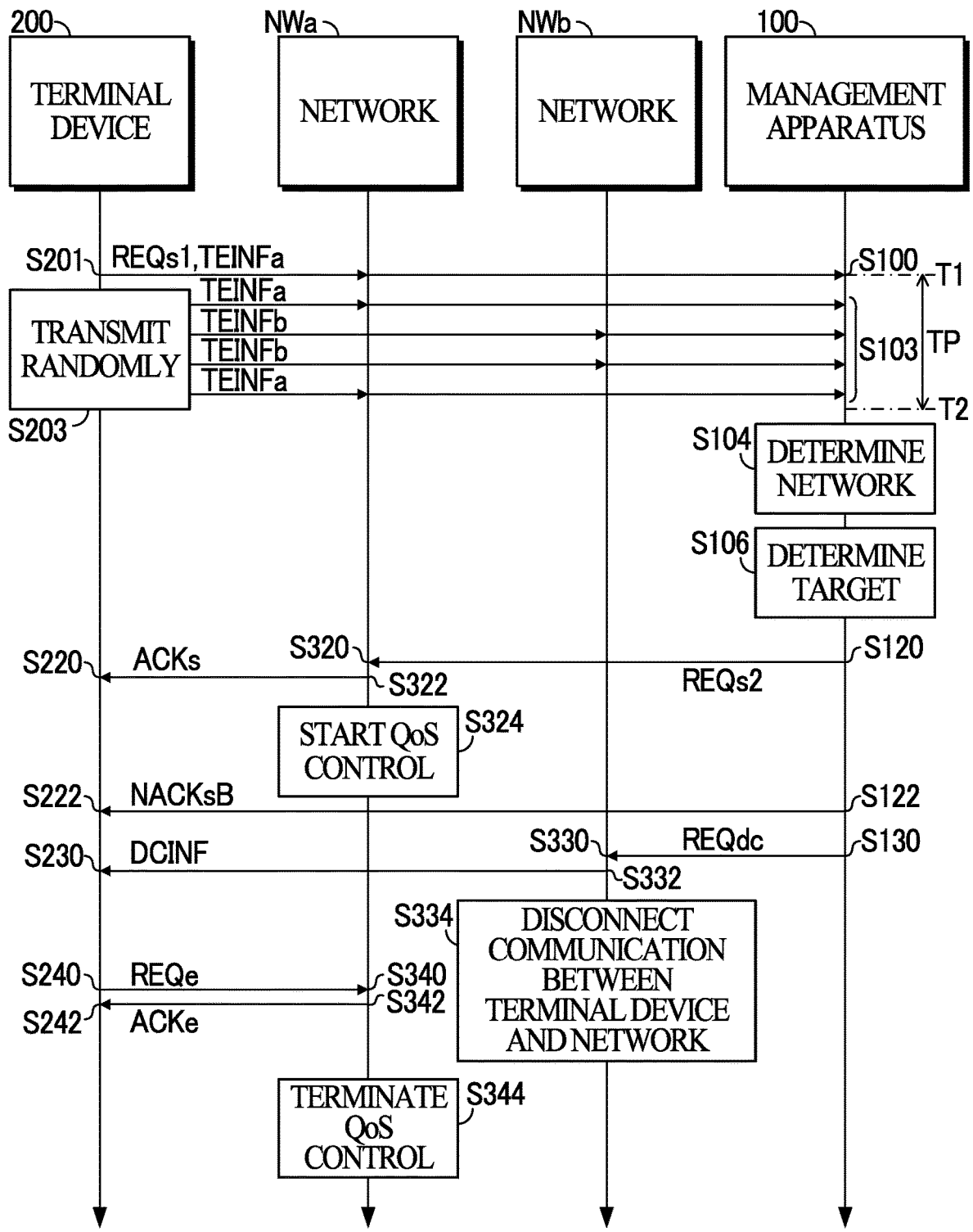
FIG. 8 is a sequence chart showing an example of an operation of a network system according to a first modification.

FIG. 8 is a sequence chart showing an example of an operation of the network system 10 according to a first modification. In the example shown in FIG. 8, as in the example shown in FIG. 6, it is assumed that the start request REQs1 is transmitted from a terminal device 200, which is concurrently connected to the networks NWa and the NWb, among the plurality of terminal devices 200. Accordingly, even in the description of FIG. 8, unless otherwise noted, the terminal device 200 means a terminal device 200 concurrently connected to the networks NWa and NWb. In the example shown in FIG. 8, processing from step S104 is similar to those shown in FIG. 6; accordingly, explanations are omitted.

First, the requester 220 of the terminal device 200 transmits a start request REQs1 and terminal information TEINF to the management apparatus 100 via one of the plurality of networks NWa and NWb connected to the terminal device 200. In the example shown in FIG. 8, it is assumed that the start request REQs1, etc., is transmitted from the terminal device 200 via the network NWa of the networks NWa and the NWb. Thus, the requester 220 of the terminal device 200 transmits the start request REQs1 and the terminal information TEINFa to the management apparatus 100 via the network NWa of the plurality of networks NWa and NWb connected to the terminal device 200 (S201). Accordingly, the acquirer 120 of the management apparatus 100 acquires the start request REQs1 and the terminal information TEINFa transmitted from the terminal device 200 to the management apparatus 100 via the network NWa (S100).

In addition, the requester 220 of the terminal device 200 transmits terminal information TEINF to the management apparatus 100 randomly until the predetermined time has elapsed since the requester 220 transmitted the start request REQs1 and the terminal information TEINFa to the management apparatus 100 via the network NWa (S203). For example, when the terminal device 200 is connected to the plurality of networks NW, a network NW to be used to transmit the terminal information TEINF is randomly selected from among the plurality of networks NW connected to the terminal device 200. Accordingly, a plurality of pieces of terminal information TEINF, which has been transmitted from the terminal device 200 via different networks NW among the plurality of networks NW connected to the terminal device 200, can reach the management apparatus 100.

As described in FIG. 6, the terminal information TEINFa, which is transmitted from the terminal device 200 to the management apparatus 100 via the network NWa, includes, for example, information for identifying a carrier that manages the network NWa. Similarly, the terminal information TEINFb, which is transmitted from the terminal device 200 to the management apparatus 100 via the network NWb, includes, for example, information for identifying a carrier that manages the network NWb.

The acquirer 120 of the management apparatus 100 acquires the terminal information TEINFa and TEINFb transmitted from the terminal device 200 within the period from the first timing T1, at which the acquirer 120 acquires the start request REQs1, to the timing at which the predetermined time TP has elapsed since the first timing T1 (S103).

The determiner 130 of the management apparatus 100 determines the networks NW connected to the terminal device 200 from among the plurality of networks NW based on the terminal information TEINF acquired by the acquirer 120 within the predetermined time TP (S104). The determiner 130 may determine the networks NW connected to the terminal device 200 based on the terminal information TEINF each time the terminal information TEINF is received within the period from the first timing T1 to the timing at which the predetermined time TP has elapsed from since the first timing T1.

Even in the first modification, the management apparatus 100 selects the network NW (target network NW), which is appropriate as the request destination for the start of the QoS control, from among the plurality of networks NW connected to the terminal device 200; accordingly, it is possible to obtain effects similar to those in the embodiment described above.

Second Modification

In the embodiment and the first modification that are described above, the service manager 140 of the management apparatus 100 may repeatedly acquire a monitoring result of monitoring communication quality of each of the plurality of networks NW managed by the one or more carriers. In this case, the QoS utilization-determination information may be updated based on the monitoring results. In addition, the service manager 140 may repeat processing to select the target network NW from among the networks NW connected to the terminal device 200 based on the QoS utilization-determination information. In other words, the service manager 140 may repeat processing to select the target network NW from among one or more networks NW, which are connected to the terminal device 200 and which are determined by the determiner 130, based on the monitoring result. The monitoring results of the communication quality of the networks NW are obtained from the networks NW.

Even in the second modification, it is possible to obtain effects similar to those in the embodiment and in the first modification that are described above. In addition, in the second modification, the monitoring result of monitoring the communication quality of each of the networks NW is fed back to determine the target network NW. In other words, in the second modification, the target network NW is dynamically changed in accordance with the communication quality (monitoring result) of each of the networks NW. As a result, in the second modification, even when the communication quality of each of the networks NW changes, it is possible to dynamically select a network NW (a target network NW), which is capable of executing the QoS control appropriately, from among the plurality of networks NW connected to the terminal device 200.

Third Modification

In the embodiment, the first modification, and the second modification that are described above, examples are indicated in which the terminal device 200 transmits the start request REQs1 to the management apparatus 100; however, the present invention is not limited to these examples. For example, the terminal device 200 may transmit the start request REQs1 to the quality controller 300 of each of all networks NW connected to the terminal device 200. In this case, the quality controller 300, which has received the start request REQs1 from the terminal device 200, transfers the start request REQs1 to the management apparatus 100 to stand by to execute the QoS control until the start request REQs2 is received from the management apparatus 100 as a return of the start request REQs1.

For example, the determiner 130 of the management apparatus 100 determines one or more networks NW, which include the quality controller 300 that has transferred the start request REQs1 to the management apparatus 100, as one or more networks NW connected to the terminal device 200. The service manager 140 of the management apparatus 100 selects the target network NW from among the one or more networks NW connected to the terminal device 200 to transmit the start request REQs2 to the quality controller 300 of the target network NW, as a return of the start request REQs1. In addition, the service manager 140 may transmit information (for example, a negative acknowledgement response NACKs), which causes the quality controller 300 of the non-target network NW not to execute the QoS control corresponding to the start request REQs1, to the quality controller 300 of the non-target network NW.

Even in the third modification, when an application program, which is installed in the terminal device 200 capable of being concurrently connected to a plurality of networks NW, requests the start of the QoS control, it is possible to prevent the application program from becoming complicated. However, in the third modification, the destination for the start request REQs1 is determined in accordance with the carrier; accordingly, the application program may be complicated compared to the embodiment, the first modification, and the second modification that are described above.

Fourth Modification

In the embodiment, and the first to third modifications that are described above, examples are indicated in which the control processing to cause the target network NW to start the QoS control includes the processing to transmit the start request REQs2 to the target network NW; however, the present invention is not limited to these examples.

For example, in the embodiment, the first modification, and the second modification that are described above, the control processing may include processing in which the management apparatus 100 transmits the carrier specific information CAINF, which is necessary for the terminal device 200 to request the target network NW to execute the QoS control, to the terminal device 200. In this case, the terminal device 200 transmits the start request REQs2 to the target network NW based on the carrier specific information CAINF received from the management apparatus 100. Even in this case, the management apparatus 100 selects the network NW, which is appropriate as the request destination for the start of the QoS control, from among the plurality of networks NW connected to the terminal device 200; accordingly, it is possible to obtain effects similar to those in the embodiment, in the first modification, and in the second modification that are described above.

In addition, for example, in the third modification described above, when the quality controller 300 is capable of determining, based on the start request REQs1 received from the terminal device 200, whether the QoS control is capable of being executed, the quality controller 300 may transmit the determination result to the management apparatus 100 or to the terminal device 200. Specifically, the quality controller 300 may transmit information, which indicates that the QoS control is capable of being executed, to the management apparatus 100 when the QoS control corresponding to the start request REQs1 is capable of being executed, whereas the quality controller 300 may transmit a negative acknowledgement response NACKs to the terminal device 200 when the QoS control corresponding to the start request REQs1 is not capable of being executed.

The service manager 140 of the management apparatus 100 selects the target network NW from among one or more networks NW that include the quality controller 300 that has transmitted the information indicating that the QoS control is capable of being executed. The service manager 140 may transmit information, which is used to release a wait for execution of the QoS control corresponding to the start request REQs1, to the quality controller 300 of the target network NW. In addition, the service manager 140 may transmit information (for example, a negative acknowledgement response NACKs), which causes the QoS control corresponding to the start request REQs1 not to be executed, to the quality controller 300 of the non-target network NW. Even in this case, the management apparatus 100 selects the network NW, which is appropriate as the request destination for the start of the QoS control, from among the plurality of networks NW connected to the terminal device 200; accordingly, it is possible to obtain effects similar to those in the third modification described above.

Fifth Modification

In the embodiment and the first to fourth modifications that are described above, examples are indicated in which the terminal device 200 transmits the termination request REQe to the quality controller 300; however, the present invention is not limited to these examples. For example, when a predetermined control termination condition regarding the terminal device 200 is satisfied, the service manager 140 of the management apparatus 100 may transmit a termination request REQe for the termination of the QoS control for the terminal device 200 to the quality controller 300 of the target network NW. The control termination condition may be, for example, a condition in which an application program, which is a target for the QoS control, terminates abnormally.

For example, the terminal device 200 may transmit terminal identification information to the management apparatus 100 at predetermined intervals during a period in which the application program, which is a target for the QoS control, is running. Transmission of the terminal identification information may be, for example, execution of a ping command.

For example, when the transmission of the terminal identification information from the terminal device 200 is interrupted, the service manager 140 of the management apparatus 100 may recognize that the application program, which is a target for the QoS control, has abnormally terminated, and then the service manager 140 may determine that the control termination condition has been satisfied. In this case, the service manager 140 of the management apparatus 100 transmits the termination request REQe for the termination of the QoS control for the terminal device 200 to the quality controller 300 of the target network NW.

Thus, the quality controller 300 of the target network NW terminates the QoS control for the terminal device 200 indicated by the termination request REQe. Accordingly, for example, when the application program, which is a target for the QoS control, terminates abnormally, the management apparatus 100 is capable of terminating the QoS control for the terminal device 200. In this case, it is possible to prevent the continuation of unnecessary QoS control.

Alternatively, for example, by inquiring of the terminal device 200 whether the application program, which is a target for the QoS control, is running, the service manager 140 of the management apparatus 100 may determine whether the application program, which is a target for the QoS control, has abnormally terminated.

The control termination condition is not limited to the abnormal termination of the application program, which is a target for the QoS control. For example, the control termination condition may include abnormal termination of the terminal device 200 or alternatively, the control termination condition may include disconnecting connection between the terminal device 200 and the target network NW without executing predetermined processing.

Even in the fifth modification, it is possible to obtain effects similar to those in the embodiment and in the first to fourth modifications that are described above. In addition, in the fifth modification, when the predetermined control termination condition regarding the terminal device 200 is satisfied, the QoS control for the terminal device 200 can be terminated; accordingly, it is possible to prevent the continuation of unnecessary QoS control. In other words, in the fifth modification, for example, when an error occurs in the terminal device 200, it is possible to return the quality of the communication service in the target network NW to an original state (a state before the QoS control for the terminal device 200 is executed) normally.

Sixth Modification

In the embodiment and the first to fifth modifications that are described above, no example is particularly described in which a carrier determined by the determiner 130 is a virtual mobile communication carrier; however, when the carrier is a virtual mobile communication carrier, the management apparatus 100 may operate, for example, as described in examples below.

When the virtual mobile communication carrier has the authority to execute the QoS control on a network NW managed by the virtual mobile communication carrier, an operation of the management apparatus 100 is similar to that of the management apparatus 100 in the embodiment and modifications described above.

When a different carrier has the authority to execute the QoS control on the network NW managed by the virtual mobile communication carrier, the management apparatus 100 may transmit, for example, carrier identification information, which is used to identify the virtual mobile communication carrier, and the start request REQs2 to the quality controller 300 managed by the different carrier. The different carrier is, for example, a mobile communication carrier that leases the network NW to the virtual mobile communication carrier. The carrier identification information may be, for example, an APN for the virtual mobile communication carrier. The quality controller 300 managed by the different carrier may determine, based on the carrier identification information and the start request REQs2, whether to execute the QoS control. In addition, a predetermined device managed by the virtual mobile communication carrier may inquire, for example, of the quality controller 300 managed by the different carrier whether to execute the QoS control.

Even in the sixth modification, it is possible to obtain effects similar to those in the embodiment and in the modifications that are described above.

Seventh Modification

In the embodiment and the first to sixth modifications that are described above, no example is particularly described in which the communication service is provided by overseas roaming; however, when the communication service is provided by overseas roaming, the management apparatus 100 may operate as in the embodiment and the first to sixth modifications that are described above. However, the management apparatus 100 or the terminal device 200 may determine whether the communication service is provided by overseas roaming, and the management apparatus 100 or the terminal device 200 may determine, based on the determination result, whether to request the start of the QoS control. Alternatively, the quality controller 300 may determine whether the communication service is provided by overseas roaming, and the quality controller 300 may determine, based on the determination result, whether to execute the QoS control. Thus, even in the seventh modification, it is possible to obtain effects similar to those in the embodiment and in the modifications that are described above.

Eighth Modification

In the embodiment and the first to seventh modifications that are described above, examples are indicated in which the terminal device 200 transmits the start request REQs1 to the management apparatus 100; however, the present invention is not limited to these examples. For example, an application management apparatus (not shown in FIG. 1, etc.), which is a communication destination for the terminal device 200 that is executing an application program that is a target for the QoS control, may transmit the start request REQs1 for the QoS control for the terminal device 200 and the terminal information TEINF regarding to the terminal device 200 to the management apparatus 100. In other words, the acquirer 120 of the management apparatus 100 may acquire the start request REQs1 for the QoS control for the terminal device 200 and the terminal information TEINF related to the terminal device 200 from the application management apparatus. Even in this case, it is possible to obtain effects similar to those in the embodiment and in the modifications that are described above.

The acquirer 120 of the management apparatus 100 may acquire the terminal information TEINF, which is related to the terminal device 200 that is executing the application program that is a target for the QoS control, from the terminal device 200 or the application management apparatus even during a period after the timing at which the predetermined time TP has elapsed from since the first timing T1. The service manager 140 of the management apparatus 100 may change the target network NW based on the terminal information TEINF (for example, application information and area information, etc.) within the period after the timing at which the predetermined time TP has elapsed since the first timing T1. For example, the target network NW may be changed in accordance with a change in position of the terminal device 200 subject to the QoS control. Even in this case, it is possible to obtain effects similar to those in the embodiment and in the modifications that are described above.

3. Other Matters (1) In the foregoing embodiments, the storage device (such as the storage devices 160 and 260) is a recording medium readable by the processor (such as the processors 110 and 210), such as ROM and RAM; however, the storage device may be flexible disks, magneto-optical disks (e.g., compact disks, digital multi-purpose disks, Blu-ray (registered trademark) discs, smart-cards, flash memory devices (e.g., cards, sticks, key drives), Compact Disc-ROMs (CD-ROMs), registers, removable discs, hard disks, floppy (registered trademark) disks, magnetic strips, databases, servers, or other suitable storage mediums. The program may be transmitted from a network via telecommunication lines. Alternatively, the program may be transmitted from a communication network via telecommunication lines.

(2) The foregoing embodiments may be applicable to at least one of systems using Long Term Evolution (LTE), LTE-advanced (LTE-A), SUPER 3G, IMT-Advanced, 4th generation mobile communication system (4G), 5th generation mobile communication system (5G), future radio access (FRA), new Radio (NR), W-CDMA (registered trademark), GSM (registered trademark), CDMA2000, ultra mobile broadband (UMB), IEEE 802.11 [Wi-Fi (registered trademark)], IEEE 802.16 [WiMAX (registered trademark)], IEEE 802.20, Ultra-wideband (UWB), Bluetooth (registered trademark), and other appropriate systems, and next-generation systems extended based on the system. In addition, the embodiments described above may be applicable to a combination of multiple systems (for example, a combination of 5G with at least one of LTE and LTE-A, etc.).

(3) In the foregoing embodiments, information, signals and the like may be presented by use of various techniques. For example, data, instructions, commands, information, signals, bits, symbols, chips, and the like may be presented by freely selected combination of voltages, currents, electromagnetic waves, magnetic fields or magnetic particles, light fields or photons.

(4) In the foregoing embodiments, the input and output of information, or the input or output of information, etc., may be stored in a specific location (e.g., memory) or may be managed by use of a management table. The information, etc., that is the input and output, or the input or the output, may be overwritten, updated, or appended. The information, etc., that is output may be deleted. The information, etc., that is input may be transmitted to other devices.

(5) In the foregoing embodiments, determination may be made by values that can be represented by one bit (0 or 1), may be made in Boolean values (true or false), or may be made by comparing numerical values (for example, comparison with a predetermined value).

(6) The order of processes, sequences, flowcharts, etc., that have been used to describe the embodiments may be changed as long as they do not conflict. For example, although a variety of methods has been illustrated in this disclosure with a variety of elements of steps in exemplary orders, the specific orders presented herein are by no means limiting.

(7) Each of functions shown in drawings such as FIG. 1 is realized by freely selected combination of at least one of hardware and software. The method for realizing each functional block is not limited thereto. That is, each functional block may be implemented by one piece of device that is physically or logically aggregated. Alternatively, each functional block may be realized by directly or indirectly connecting two or more physically or logically separate pieces of device (by using cables and radio, or cables, or radio, for example), and using these devices. The functional block may be realized by combining the software with one device described above or two or more of these devices.

The communication devices 170 and 270 are each hardware (a transmitting and receiving device) for communicating between computers via at least one of a wired network and a wireless network. The communication devices 170 and 270 are each referred to as, for example, a network device, a network controller, a network card, or a communication module. The communication devices 170 and 270 may each include a high-frequency switch, duplexers, filters, or frequency synthesizers to realize Frequency Division Duplexing (FDD) and Time Division Duplexing (TDD), or FDD, or TDD, for example.

(8) In the foregoing embodiments, programs, whether referred to as software, firmware, middleware, microcode, hardware description language, or by any other name, are instructions, instruction sets, code, code segments, or program code. It should be interpreted broadly to mean programs, subprograms, software modules, applications, software applications, software packages, routines, subroutines, objects, executable files, execution threads, procedures, functions, etc.

Software, instructions, etc., may be transmitted and received via communication media. For example, when software is transmitted from a website, a server, or other remote sources, by using wired technologies such as coaxial cables, optical fiber cables, twisted-pair cables, and digital subscriber lines (DSL), and wireless technologies such as infrared radiation, radio and microwaves, etc., by using wired technologies, or by wireless technologies, these wired technologies and wireless technologies, wired technologies, or wireless technologies, are also included in the definition of communication media.

(9) In each embodiment described above, the terms "system" and "network" are used interchangeably.

(10) The information and parameters described in this disclosure may be represented by absolute values, may be represented by relative values with respect to predetermined values, or may be represented by using other pieces of applicable information. For example, radio resources may be specified by predetermined indices. The names used for parameters in this specification are in no respect limiting. In addition, equations, etc., to use these parameters may be other than those explicitly disclosed in this specification. For example, since a variety of channels (for example, PUCCH, PDCCH, etc.) and information elements (for example, TPC) can be identified by any suitable names, a variety of names to assign to these various channels and information elements are in no respect limiting.

(11) In the foregoing embodiments, the terminal device 200 may be a mobile station (MS). A mobile station (mobile device) may be referred to, by one skilled in the art as a "subscriber station", a "mobile unit", a "subscriber unit", a "wireless unit", a "remote unit", a "mobile device", a "wireless device", a "wireless communication device", a "remote device", a "mobile subscriber station", an "access terminal", a "mobile terminal", a "wireless terminal", a "remote terminal", a "handset", a "user agent", a "mobile client", a "client", or some other suitable terms. The terms "mobile station", "user terminal", "user equipment (UE)", "terminal", and the like may be used interchangeably in the present disclosure.

(12) In the foregoing embodiments, the terms "connected" and "coupled", or any modification of these terms, may mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access." As used in this specification, two elements may be considered "connected" or "coupled" to each other by using one or more electrical wires, cables and printed electrical connections, or by using one or more electrical wires, cables or printed electrical connections. In addition, two elements may be considered "connected" or "coupled" to each other by using electromagnetic energy, etc., which is a non-limiting and non-inclusive example, having wavelengths in radio frequency regions, microwave regions, and optical (both visible and invisible) regions.

(13) In the foregoing embodiments, the phrase "based on" as used in this specification does not mean "based only on", unless specified otherwise. In other words, the phrase "based on" means both "based only on" and "based at least on."

(14) The term "determining" as used in this specification may encompass a wide variety of actions. For example, the term "determining" may be used when practically "determining" that some act of calculating, computing, processing, deriving, investigating, looking up (for example, looking up a table, a database, or some other data structure), ascertaining, etc., has taken place. Furthermore, "determining" may be used when practically "determining" that some act of receiving (for example, receiving information), transmitting (for example, transmitting information), inputting, outputting, accessing (for example, accessing data in a memory) and so forth has taken place. Furthermore, "determining" may be used when practically "determining" that some act of receiving (for example, receiving information), transmitting (for example, transmitting information), inputting, outputting, accessing (for example, accessing data in a memory) and so forth has taken place. That is, "determining" may be used when practically determining to take some action. The term "determining" may be replaced with "assuming", "expecting", "considering", etc.

(15) As long as terms such as "include", "comprise" and modifications of these are used in the foregoing embodiments, these terms are intended to be inclusive, in a manner similar to the way the term "provide" is used. Furthermore, the term "or" as used in this specification or in claims is not intended to be an exclusive disjunction.

(16) In the present disclosure, when articles such as, for example, "a", "an", and "the" are added in the English translation, these articles may also indicate plural forms of words, unless the context clearly indicates otherwise.

(17) In this disclosure, the phrase "A and B are different" may mean "A and B are different from each other." The phrase "A and B are different from C, respectively" may mean that "A and B are different from C". Terms such as "separated" and "combined" may be interpreted in the same way as "different."

(18) The examples and embodiments illustrated in this specification may be used individually or in combination, which may be altered depending on the mode of implementation. A predetermined piece of information (for example, a report to the effect that something is "X") does not necessarily have to be indicated explicitly, and may be indicated in an implicit way (for example, by not reporting this predetermined piece of information, by reporting another piece of information, etc.).

Although the disclosure is described in detail, it should be obvious to one skilled in the art that the present invention is by no means limited to the embodiments described in this specification. The present disclosure can be implemented with a variety of corrections and in a variety of modifications, without departing from the spirit and scope of the present invention defined as in the recitations of the claims. Consequently, the description in this specification is provided only for the purpose of explaining examples and should by no means be construed to limit the present invention in any way.

DESCRIPTION OF REFERENCE SIGNS

10 . . . network system, 100 . . . management apparatus, 110 . . . processor, 120 . . . acquirer, 130 . . . determiner, 140 . . . service manager, 160 . . . storage device, 170 . . . communication device, 200 . . . terminal device, 210 . . . processor, 220 . . . requester, 260 . . . storage device, 270 . . . communication device, 280 . . . input device, 290 . . . output device, 300 . . . quality controller.

The invention claimed is:

1. A management apparatus comprising:
processing circuitry configured to
acquire a start request and terminal information, the start request being a request for starting control of quality of a communication service, the communication service being provided for a terminal device connected to one or more networks among a plurality of networks managed by one or more carriers, the terminal information being information related to the terminal device;
determine the one or more networks connected to the terminal device from among the plurality of networks based on the acquired terminal information; and
execute control processing to cause a target network to start the control of the quality of the communication service, the target network being a target for the control of the quality of the communication service among the one or more determined networks,
wherein:
the communication service includes a plurality of quality modes corresponding to a plurality of qualities,
the control processing includes processing, when the one or more networks connected to the terminal device include a plurality of networks, to select one, some, or all of the plurality of networks connected to the terminal device, as the target network, based on a quality mode indicated by the start request among the plurality of quality modes,
the processing circuitry is configured to select each of the plurality of networks connected to the terminal device as the target network when the quality mode indicated by the start request is a large capacity mode among the plurality of quality modes, and
the large capacity mode is a quality mode in which a large amount of data is capable of being transferred compared to an amount of data transferred in other quality modes among the plurality of quality modes.

2. The management apparatus according to claim 1, wherein:
the processing circuitry is configured, when the one or more networks connected to the terminal device include a plurality of networks, to acquire the start request transmitted from the terminal device and the terminal information transmitted from the terminal device for each of the plurality of networks connected to the terminal device, and
the processing circuitry is configured to determine the plurality of networks connected to the terminal device based on the acquired terminal information within a predetermined period of time.

3. The management apparatus according to claim 1, wherein:
the processing circuitry is configured, when the one or more networks connected to the terminal device include a plurality of networks, to acquire the terminal information transmitted from the terminal device within a predetermined period of time via one of the plurality of networks, and
the processing circuitry is configured to determine the plurality of networks connected to the terminal device based on the acquired terminal information within the predetermined period of time.

4. The management apparatus according to claim 1, wherein processing circuitry is configured to:
repeatedly acquire a monitoring result of monitoring communication quality of each of the plurality of networks managed by the one or more carriers, and
repeat processing to select, based on the monitoring result, the target network from among the one or more networks that are connected to the terminal device and that are determined.

5. A management apparatus comprising:
processing circuitry configured to
acquire a start request and terminal information, the start request being a request for starting control of quality of a communication service, the communication service being provided for a terminal device connected to one or more networks among a plurality of networks managed by one or more carriers, the terminal information being information related to the terminal device;
determine the one or more networks connected to the terminal device from among the plurality of networks based on the acquired terminal information; and
execute control processing to cause a target network to start the control of the quality of the communication service, the target network being a target for the control of the quality of the communication service among the one or more determined networks,
wherein:
the communication service includes a plurality of quality modes corresponding to a plurality of qualities,
the control processing includes processing, when the one or more networks connected to the terminal device include a plurality of networks, to select one, some, or all of the plurality of networks connected to the terminal device, as the target network, based on a quality mode indicated by the start request among the plurality of quality modes,
the processing circuitry is configured, when the quality mode indicated by the start request is a large capacity mode among the plurality of quality modes, to:
select a network with communication quality higher than or equal to a predetermined level from among the plurality of networks connected to the terminal device as the target network; and
execute processing to disconnect communication between the terminal device and a network other than the target network among the plurality of networks connected to the terminal device, and
the large capacity mode is a quality mode in which a large amount of data is capable of being transferred compared to an amount of data transferred in other quality modes among the plurality of quality modes.

6. The management apparatus according to claim 5, wherein:
the processing circuitry is configured, when the one or more networks connected to the terminal device include a plurality of networks, to acquire the start request transmitted from the terminal device and the terminal information transmitted from the terminal device for each of the plurality of networks connected to the terminal device, and
the processing circuitry is configured to determine the plurality of networks connected to the terminal device based on the acquired terminal information within a predetermined period of time.

7. The management apparatus according to claim 5, wherein:
the processing circuitry is configured, when the one or more networks connected to the terminal device include a plurality of networks, to acquire the terminal information transmitted from the terminal device within a predetermined period of time via one of the plurality of networks, and
the processing circuitry is configured to determine the plurality of networks connected to the terminal device based on the acquired terminal information within the predetermined period of time.

8. The management apparatus according to claim 5, wherein processing circuitry is configured to:
repeatedly acquire a monitoring result of monitoring communication quality of each of the plurality of networks managed by the one or more carriers, and
repeat processing to select, based on the monitoring result, the target network from among the one or more networks that are connected to the terminal device and that are determined.

9. A management apparatus comprising:
processing circuitry configured to
acquire a start request and terminal information, the start request being a request for starting control of quality of a communication service, the communication service being provided for a terminal device connected to one or more networks among a plurality of networks managed by one or more carriers, the terminal information being information related to the terminal device;
determine the one or more networks connected to the terminal device from among the plurality of networks based on the acquired terminal information; and
execute control processing to cause a target network to start the control of the quality of the communication service, the target network being a target for the control of the quality of the communication service among the one or more determined networks,
wherein:
the communication service includes a plurality of quality modes corresponding to a plurality of qualities,
the control processing includes processing, when the one or more networks connected to the terminal device include a plurality of networks, to select one, some, or all of the plurality of networks connected to the terminal device, as the target network, based on a quality mode indicated by the start request among the plurality of quality modes,
the processing circuitry is configured to select one of the plurality of networks connected to the terminal device as the target network when the quality mode indicated by the start request is a low latency mode among the plurality of quality modes, and
the low latency mode is a quality mode in which a latency in communication is small compared to a latency in communication in other quality modes among the plurality of quality modes, wherein the processing circuitry is configured to execute processing to disconnect communication between the terminal device and a network other than the target network among the plurality of networks connected to the terminal device.

10. The management apparatus according to claim 9, wherein:
the processing circuitry is configured, when the one or more networks connected to the terminal device include a plurality of networks, to acquire the start request transmitted from the terminal device and the terminal information transmitted from the terminal device for each of the plurality of networks connected to the terminal device, and the processing circuitry is configured to determine the plurality of networks connected to the terminal device based on the acquired terminal information within a predetermined period of time.

11. The management apparatus according to claim 9, wherein:

the processing circuitry is configured, when the one or more networks connected to the terminal device include a plurality of networks, to acquire the terminal information transmitted from the terminal device within a predetermined period of time via one of the plurality of networks, and the processing circuitry is configured to determine the plurality of networks connected to the terminal device based on the acquired terminal information within the predetermined period of time.

12. The management apparatus according to claim 9, wherein the processing circuitry is configured to:

repeatedly acquire a monitoring result of monitoring communication quality of each of the plurality of networks managed by the one or more carriers, and repeat processing to select, based on the monitoring result, the target network from among the one or more networks that are connected to the terminal device and that are determined.

13. The management apparatus according to claim 9, wherein the processing circuitry is configured to select a network with highest communication quality among the plurality of networks connected to the terminal device as the target network when the quality mode indicated by the start request is the low latency mode.

14. The management apparatus according to claim 13, wherein the processing circuitry is configured to execute processing to disconnect communication between the terminal device and a network other than the target network among the plurality of networks connected to the terminal device.

* * * * *